United States Patent [19]

Susman

[11] Patent Number: 5,261,041
[45] Date of Patent: Nov. 9, 1993

[54] COMPUTER CONTROLLED ANIMATION SYSTEM BASED ON DEFINITIONAL ANIMATED OBJECTS AND METHODS OF MANIPULATING SAME

[75] Inventor: Galyn Susman, Mountain View, Calif.

[73] Assignee: Apple Computer, Inc., Cupertino, Calif.

[21] Appl. No.: 635,769

[22] Filed: Dec. 28, 1990

[51] Int. Cl.⁵ .................... G06F 15/66; G06F 15/72
[52] U.S. Cl. .................................. 395/152; 395/119; 395/122; 395/130; 395/135
[58] Field of Search ............... 395/152, 119, 124, 135; 340/725, 729; 273/434; 364/410

[56] References Cited

U.S. PATENT DOCUMENTS

| | | | |
|---|---|---|---|
| 3,585,628 | 6/1971 | Harrison | 340/324.8 |
| 4,530,499 | 7/1985 | Breslow et al. | 273/1 GC |
| 4,643,421 | 2/1987 | Meyer et al. | 273/1 E |
| 4,894,774 | 1/1990 | McCarthy et al. | 364/410 |
| 4,951,038 | 8/1990 | Yamamura | 340/725 |
| 5,003,497 | 3/1991 | Priem | 364/522 |
| 5,090,909 | 2/1992 | Kellar et al. | 434/43 |

*Primary Examiner*—Gary V. Harkcom
*Assistant Examiner*—Joseph Feild
*Attorney, Agent, or Firm*—Blakely, Sokoloff, Taylor & Zafman

[57] ABSTRACT

A computer system and method for the generation and manipulation of animated objects in a computer-controlled environment. The animated objects include state data and methods defining the behavior of the object. The animated objects also have an associated affect volume and affect agents. An interaction manager controls the interaction between objects as the animation sequence progresses. An animation sequence is controlled by a set of rules, state graphs, or scripts. The behavior of objects is modeled using a descriptive and a mathematical representation. Objects containing visual characteristics are rendered to a display screen.

34 Claims, 10 Drawing Sheets

Three Stages of Interaction between a Match and a Bottle

Multiple frames of a falling block
with a bounce to the right

A parametric Path to Describe Motion
of a Polygon Vertex through Time (t)

Mechanical Collision Affect Volumes
for 2 Cube-shaped Objects

Before Intersection (No Collision)   After Intersection (Collision)

Object Volumes at Instant
Beginning Time Interval

Collision Affect Volumes Integrating
Position Across Time Interval

Object Volumes at Instant
Beginning Time

Collision Affect Volumes Integrating
Position Across Time Interval

A Match Object with 2 Affect Agents
and 2 Affect Volumes

A Bottle Object with 3 Affect Agents
and 2 Affect Volumes

Three Stages of Interaction between a Match and a Bottle

COMPUTER CONTROLLED ANIMATION SYSTEM BASED ON DEFINITIONAL ANIMATED OBJECTS AND METHODS OF MANIPULATING SAME

BACKGROUND OF THE INVENTION

1. Field of the Invention

The present invention relates to an architecture and model for computer animation. Specifically, the present invention concerns the field of generation and manipulation of moving objects in a computer system.

2. Prior Art

"Computer Animation" is a term that is used to describe any application in which a computer aids in the generation and manipulation of moving images. This broad category of activities includes motion control, computer-assisted frame animation, key frame animation, color table animation, solid model animation, and two-dimensional (2D) and three-dimensional (3D) simulation. As a field, computer animation is rapidly growing. In the past ten years improvements in computer speed, size and cost have made animation by computer feasible for many new applications. Computer animation is now widely sought by applications in industry, science, manufacturing, entertainment, advertising and education. The present invention describes a comprehensive computer animation architecture.

Developing an architecture for animation means providing a mechanism (i.e. structures, utility routines, etc.) for manipulating computer displayable objects in space and time. In the following description, an object is defined as any entity controllable within an animation. This object can be visible (an animated character) or invisible (a camera or light). It can be entirely self controlled (a weight within a physics simulation) or can be controlled by external inputs (joystick or mouse). The object's physical representation can be in two dimensions or in three dimensions, a bitmap, or a collection of points and edges. Just as there are many possibilities for types of objects, there are an equal number of possibilities for types of object interactions. Combine these parameters with all of the different kinds of animation that one can create with these objects and interactions and it becomes apparent that the basic architecture must be readily extensible as well as customizable to individual application needs. It also becomes apparent that one of the primary features of an animation architecture is to provide a data-interchange format so that applications or other software components can share and include other kinds of animations, objects, etc. All of these options must be considered when designing the facilities to manipulate objects through space in real-time.

Animation presents a different way of looking at data or information. Just as graphics help to interpret large databases, animation can be even more useful for visualizing data. Simple and complete animation support will provide this power to applications that were never before able to use animation.

To date, sophisticated animation systems have been far from real-time. This is due to the demand for production quality animation coupled with insufficient hardware capabilities. As a result, the creation of a single frame of animation (typically 1/24 or 1/30 of a second) can take anywhere from several seconds to several days. An animation frame is a collection of objects or images displayable on a display screen. The animation frame represents the position and condition of objects at an instant in time. Keyframes are animation image frames initially provided to the animation system and used as a reference when moving objects.

Animation in interactive situations can often settle for a lesser quality of imaging than production graphics demand. For example, both television and video games have graphics quality of much less quality than that of traditional static graphic arts; yet, television and games remain a successful media because they are coupled with motion and sound. This kind of imaging, when used in conjunction with high quality sound and motion, can be very effective for many applications, especially those focusing on user interaction. If we further reduce the computation time by adding the capabilities of high performance hardware we will be able to create reasonable quality animation in real-time. The present invention provides a solution for efficiently generating real-time animation, since real-time response was a primary goal at the outset. In addition, the present invention provides a robust animation model providing features not available in existing prior art systems.

EXISTING APPROACHES

Currently, the world of computer animation can be divided into two separate categories: assisted animation employing a descriptive representation, and full-synthesis animation employing a numerical representation. Assisted animation consists of animation in which the computer mainly provides camera control, inbetweening (interpolation of images between keyframes), the process of coloring images, compositing (combining object images into frames), and digital sequencing of images. The input into an assisted animation system is a collection of keyframe images (or bitmaps). Input is often limited to scanned images or images generated in a paint program. The output is generally a sequence of these images, occasionally including simple inbetween frames that have been calculated from keyframes. Assisted animation includes most varieties of motion control graphics, computer-assisted frame animation and color table animation. The computer is responsible for calculating inbetween frames from keyframes and for sequencing generated frames in real-time.

Full-synthesis animation differs substantially from assisted animation. In full-synthesis animation, the computer manipulates numerical data bases instead of material artwork or image bitmaps. In full-synthesis animation, all characters, objects and environments have a mathematical description that is modified either interactively or by a script. All of these systems are based on the concept of manipulating a mathematical model for a variety of parameters including position, velocity, and proximity of objects. A "language" exists to specify actions as well as compositing and sequencing. The animation language includes a "vocabulary" to specify when actions begin and end (duration), and their rates of change (eases). Much of the current research in the field of computer animation and simulation falls under the category of full-synthesis animation.

There is a strong demand in the animation community for the ability to accurately model real world phenomena. The application of physics to bodies within a system, namely kinematics, and more recently dynamics, has inspired the creation of what is now being called procedural animation. Kinematics approaches physical systems by taking the positional goal for an object and solving for the velocities that will cause an object to arrive at that position. Conversely, dynamics takes the forces and torques being applied to an object and solves for the resultant positional information. Very often these systems are designed so that the language to specify actions is a collection of constraints. Constraints include any method that defines the relationship between parts of an object and between the objects themselves. The vocabulary that determines the duration and eases, including the actual position and velocity related information, are procedures that apply the laws of physics to the interacting objects. In general, the concept of full-synthesis animation can be stretched to cover a large variety of approaches to computer animation. The major distinction to be made here is that full-synthesis animation systems are designed to manipulate mathematical representations of objects instead of descriptive representations.

Prior art animation systems handle sound in animation either independently or loosely-coupled from the displayed images. In fact, in a typical animation production a significant amount of time is spent just synchronizing the sound track with the visual aspects of the animation. Separating the auditory from the visual aspects of an animation limits the generality of the animation system, since such an arrangement does not permit sophisticated sound generation from object interaction to be handled automatically. Consequently, it is very hard to have the sound achieve the same realism as the visual aspects of the animation.

There are certainly advantages to each variety of animation. Assisted animation has very little computational overhead; thus, it is a more practical choice for doing animation in an interactive environment. Full-synthesis animation provides a better animation model; however, such systems presently cannot operate at a real-time speed. A better solution is to support both assisted animation and full-synthesis animation within the same environment. The idea is to allow descriptive and numerical representations of objects to be mixed and matched freely within a single animation domain. For example, it may be practical to treat objects of less distinction (i.e. backgrounds and objects that do not interact with other objects) as bitmaps (descriptive representations), while the more prominent objects are mathematically represented. To extend this idea further, one may want to model an object descriptively while it is inactive and then switch to the numerical definition when the object becomes active. The present invention provides a system that has the flexibility of a full-synthesis system with the overhead approaching that of a computer assisted animation system.

REFERENCES CITED

1. Armstrong, William and Mark Green and Robert Lake, "Near Real-Time Control of Human Figure Models," University of Alberta, *IEEE Computer Graphics and Applications*, June 1987.
2. Badler, Norman I. and Kamran H. Manoochehri and Graham Walters, "Articulated Figure Positioning by Multiple Constraints," University of Pennsylvania, *IEEE Computer Graphics and Applications*, June 1987.
3. Bagrodia, Rajive L. And K. Mani Chandy and Jayadev Misra, "A Message-Based Approach to Discrete Event Simulation," *IEEE Transactions on Software Engineering*, Vol. SE-13, #6, June 1987.
4. Borning, Alan, "Thinglab - A constraint Oriented Simulation Laboratory," XEROX Palo Alto Research Center, *Computer Graphics*, Vol. 16, #3, July 1982.
5. Entis, Glenn, "Computer Animation - 3D Motion Specification and Control," Pacific Data Images, Siggraph '86 Tutorial Notes.
6. Fox, David, "Do it Yourself Computer Animation," Lucasfilm Ltd., May 1, 1985.
7. Girard, Michael, "Interactive Design of 3D Computer-Animated Legged Animal Motion," Ohio State University, *IEEE Computer Graphics and Applications*, June 1987.
8. Korein, James U. and Norman I. Badler, "Techniques for Generating the Goal-Directed Motion of Articulated Structures," University of Pennsylvania, *IEEE Computer Graphics and Applications*, Nov. 1982.
9. Lasseter, John, "Principles of Traditional Animation Applied to 3D Computer Animation," Pixar, *ACM Computer Graphics*, Vol. 21, #4, July, 1987.
10. McQueen, Gleen, "Applying Classical Techniques to Computer Animation," New York Institute of Technology, Siggraph '87 Tutorial Notes.
11. Reynolds, Craig W., "Computer Animation with Scripts and Actors," Information International Inc., *Computer Graphics*, Vol. 16, #3, July 1982.
12. Shelley, Kim L. and Donald D. Greenberg, "Path Specification and Path Coherence," Cornell University Computer, *Computer Graphics*, Vol. 16, #3, July 1982.
13. Sleketee, Scott N. and Norman I. Badler, "Parametric Keyframe Interpolation Incorporating Kinetic Adjustment and Phrasing Control," Department of Computer and Information Science, University of Pennsylvania, *San Francisco*, Vol. 19, #3 July 1985.
14. Smith, Karen E., "Requirements and Design for Intercoast-A Constraint Oriented Animation System," Institute for Research in Information and Scholarship, Brown University.
15. Sturman, David, "Interactive Keyframe Animation of 3D Articulated Models," New York Institute of Technology, Siggraph '87 Tutorial Notes.
16. Thalmann, Daniel and Nadia Magnenat-Thalmann, *Computer Animation Theory and Practice*, Tokyo, Springer Verlag, 1985
17. Thalmann, Daniel and Nadia Magnenat-Thalmann, "Controlling Evolution and Motion Using the CINEMIRA-2 Animation Sublanguage," University of Montreal.
18. Thomas, Frank and Johnston, Ollie, *Disney Animation—The Illusion of Life*, Abbeville Press, New York, 1981.
19. Wilhelms, Jane, "Dynamics for Everyone," University of California, Santa Cruz, *IEEE Computer Graphics and Applications*, Vol. 7, #6, June, 1987.
20. Wilhelms, Jane, "Toward Automatic Motion Control," University of California, Santa Cruz, *IEEE Computer Graphics and Applications*, Vol. 7, #4, April, 1987.

SUMMARY OF THE INVENTION

The present invention provides an architecture and model for computer animation. A computer system and animation model of the present invention provides a means and a method for the efficient generation and manipulation of animated objects in a computer-controlled environment. The animated objects include state data and methods defining the behavior of the object. The animated objects also have an associated affect volume and affect agents. An interaction manager controls the interaction between objects as the animation sequence progresses. An animation sequence is controlled by a set of rules, state graphs, or scripts. The behavior of objects is modeled using a descriptive and a mathematical representation. Objects containing visual characteristics are finally rendered to a display screen.

It is a goal of the present invention to provide a unique and useful set of features in an animation architecture which are not provided by any existing computer animation systems. These features can be broken into the following five categories: real-time performance, ease of use, extensibility, hardware independence, and data interchangeability.

Real-Time Performance. Although some people use computers for non-real-time animation applications, the vast majority of users will not. People expect interactivity from computers. They are accustomed to the graphics and sound responding immediately to their manual input. The present invention provides an animation model for use in real-time.

Affordable output also necessitates real-time performance from an animation system. Just as the printed document is the standard output medium of computer-generated text and diagrams, videotape is the standard output medium of computer-generated animation. Except for very expensive studio versions, videotape machines cannot record frame-by-frame; they can only record at a continuous rate. Consequently, if an animation system generates frames in non-real-time, it will be beyond most people's means to record their animations, even if they have the patience to wait for the frames to be generated. Thus, the present invention also provides a means for producing an inexpensive animation output.

Ease of Use. Animation must be as easy to use as static graphics is today. If the animation tools provided by the animation system are simple and complete, applications that normally would not be able to represent their ideas with motion will suddenly have the power to do so. The present invention provides the power of animation in conjunction with a user interface that is easy to use.

Extensibility. An animation system must be extensible in terms of new hardware and software capabilities. Computer manufacturers and third party developers are designing hardware that can accelerate the performance of animation. Special purpose hardware should be able to improve the performance of segments of the animation system in an architecturally controlled way. Similarly, the software implementation of the animation system must be modular so that advanced software components can augment or replace existing modules in the system. The present invention provides this flexibility and extensibility.

Hardware Independence. One of the fundamental principles of the animation architecture of the present invention is to provide hardware independence to application software and hardware. By designing a complete animation environment independent of hardware, the animation model is not vulnerable to unexpected hardware modifications. The animation architecture of the present invention is not dependent upon any specific computer hardware configuration.

Data Interchangeability. Users should be able to extract animated objects that are created in one computer application and use them in another application. The animation model of the present invention allows users to cut and paste animated objects between application programs.

DETAILED DESCRIPTION OF THE INVENTION

The present invention provides a means and method for the efficient generation and manipulation of objects and images in a computer animation model. The animation of objects occurs in a domain called the world model. The actions and reactions of the objects within the domain over a period of time are monitored and controlled through the processes of the present invention.

The World Model

The World Model provides the skeletal structure for animation in the present invention. The essence of animation is motion and change: the motion of characters and their metamorphoses or change in shape, concept and color. Though motion and change have physical or spatial characteristics, they are events that can only be perceived over a period of time. Thus, the only completely independent variable in an animation system is time. All spatial transformations are dependent upon this time variable.

One might look at this world model as a reflection of the real world. Time cannot be repeated; the motions of an event that happened an hour ago can be reenacted, but not recreated. In the same sense, time proceeds steadily in our animation environment. Although a character's motion may repeat (e.g. a walking sequence), each reenaction of that motion is a unique event in time.

The World Model (World) defines a three dimensional physical space within which all objects and their time dependent interactions exist. Though this global space is defined in three dimensions, all elements within their animation environment do not have to be geometrically defined in three dimensions. For example, objects can have 2½D (two-dimensional (2D) description with a limited Z-axis location) or full 3D representations within this space. In this way, the most simple description possible can be used for every object.

Objects

Figure 1:
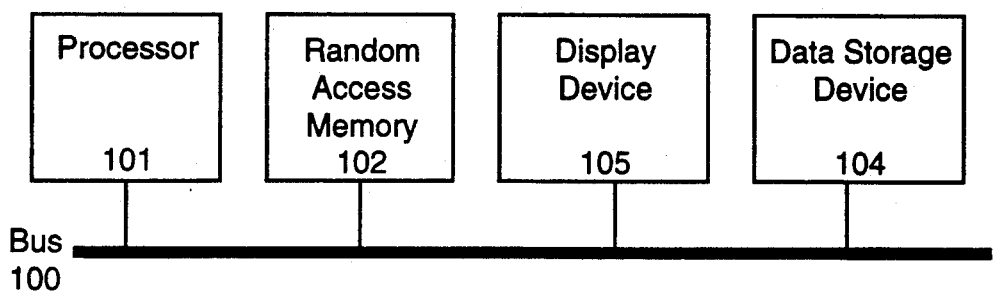
FIG. 1 illustrates a computer system incorporating the present invention.
Figure 2:
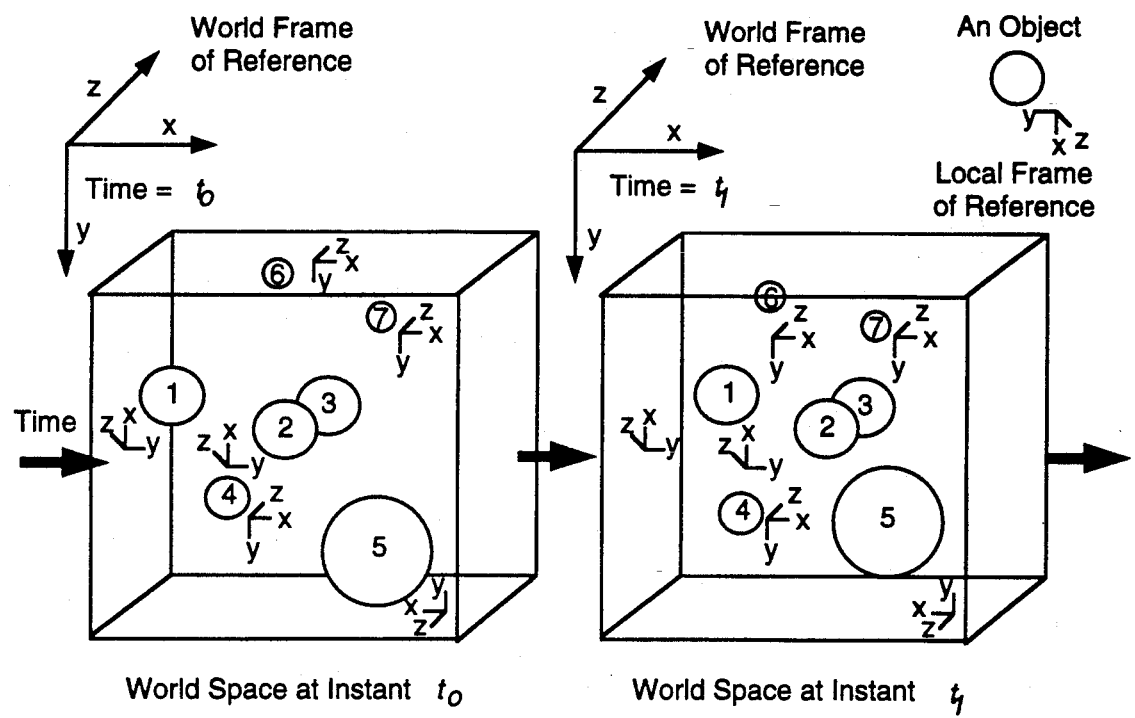
FIG. 2 illustrates World Model space depicted over a time interval.

Objects are isolated entities unto themselves; each with its own local frame of reference for space and time. When an object is geometrically defined it makes sense for that object to have a local origin of (0,0,0). Similarly, when an action for an object is defined it can be specified to begin at local time 0. By working in a local space objects are defined without regard for their space and time mappings in the World. These global locations are not defined until animation time when mappings are made from the local frames to the global frames of reference for space and time. World Model space over a time interval is depicted in FIG. 2. As shown in FIG. 2, objects 1-7, each with their own local frame of reference, are moved from their position at time $t_0$ to a position at time $t_1$ in reference to a world frame of reference.

Aside from having its local frame of reference for space and time, an object has: 1) a collection of values (e.g. current size, orientation, color, temperament) which represent other states of the object and, 2) a collection of methods (actions that the object can perform) that describe its behavior. This combination of state and behavior completely defines an object's characteristics and abilities within an animation environment. These independent objects are then able to communicate with each other to determine the response to interactions that can occur within an animation.

It is within this definition of an object that everything (other than management of time and the management of space for an interval of time) is modeled. Stick figures, cartoon characters, lights, cameras and even input devices are treated as animation objects with state and behavior. In the sections that follow, it will become clearer how time and space are maintained, how objects are defined within this time and space, and how objects interact.

Time

As discussed above, time is the main independent variable in the animation system. There are, however, many different ways to measure time. If we look at our own world, we have several different calendars that refer to the same time by different units of measure. This is because the references upon which time is being measured are different. Similarly, objects within an animation system can utilize different time bases. A relationship between these time bases and global time must be defined and maintained if an animation is to behave consistently.

World Time vs. Local Time

Every animation has a master clock that maintains the global time to which all other events are related. This independent time measure is called World Time. World Time is considered to begin at some arbitrary time 0, and proceed uninterrupted throughout the life of an animation. World Time does not necessarily have an exact relationship (e.g. that of equality) with the host computer's real-time clock. "Fast-forwarding" an animation is an example of World Time being shorter than real-time, and "Slow-rewind" is an example of World Time being longer than and inversely related to real-time.

We have previously mentioned that an object has its own local time frame for the specification of actions performed by the object. This local time frame is not an independent variable. It specifies the duration of a set of events that must then be related or mapped to World Time. These mappings, as well as the master clock itself, must be maintained throughout the animation.

The ability to nest relative time frames is important. Objects made of moving parts, each with their own relative measure of time, can be combined to create more complex objects. A simple example of this is a moving car; the wheels rotate in their own time frame on axes relative to the frame of the car and the car moves in a time frame relative to background. All of these local time frames represent measures of time that must eventually (at the top of the hierarchy) be related to World Time.

Intervals vs. Instants

Although time is a continuum, the host computer is a system which deals with discrete entities. Consequently, there must be a means to break up time into individual units. Furthermore, all display mediums are at some level divided into discrete frames. There must be a method of subdividing continuously changing images into frames.

A simple method to break continuous time into discrete time is to sample it at instants or snapshots in time. When these "snapshots" of time are combined into a sequence, however, they only preserve the illusion of continuous time to a certain level of fidelity. Events occurring too quickly (effectively falling between the samples) will be missed. This has many ramifications in a time-modeling system, with two notable ramifications being collision detection failures and the visual perception of jerky motion. These problems are all due to temporal aliasing.

Figure 3:
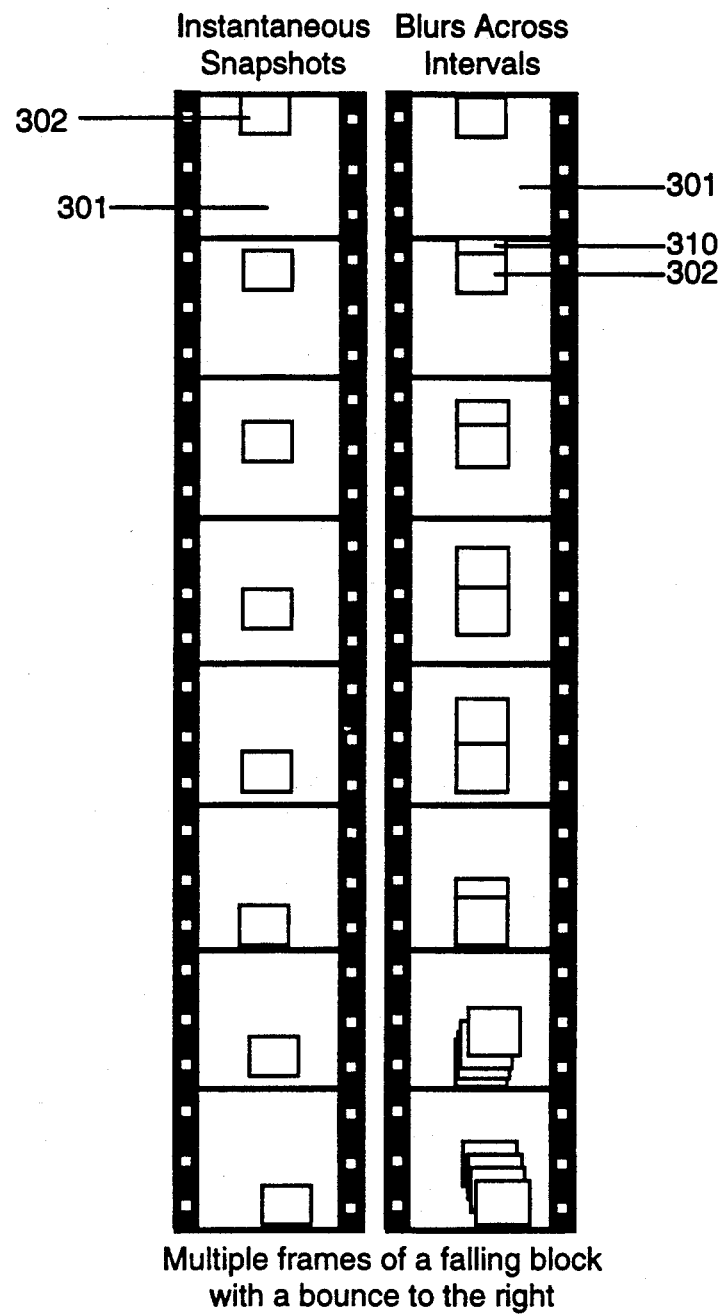
FIG. 3 illustrates instantaneous snapshots and motion blur.

One method to compensate for the effect of temporal aliasing is to break up time into discrete intervals (periods of time) instead of instants (points in time). All changes are then considered for the duration of an interval, rather than the particular state at an instant. If object changes are described in terms of continuous functions rather than step functions, an object's state can be evaluated over an interval of time by an integration of these continuous functions across that interval. Motion blur is an example of this kind of integration. Instantaneous snapshots related to motion blur is illustrated in FIG. 3.

The present invention is built around discrete time intervals to compensate for the effects of temporal aliasing. The user may express time as instants (e.g. keyframes) if she chooses, leaving the system to interpret time continuously (e.g. generating inbetween frames based on an interval of time). The present invention also approximates intervals with instants for less robust applications which do not require the most sophisticated model.

Object Motion

All objects can be defined in four continuous dimensions (4D), three spatial and one temporal. Other definitions for an object might include properties and abilities that do not equate with a dimensional model. For example, the color, the sound, and even the mood of an object can be defined. Maintaining space-time as a continuum provides the necessary data for objects to be accurately rendered, free of aliasing, for any interval of time and from any point of view (POV). Traditional animation techniques provide continuity in space, but model time as a sequence of discrete events. An illusion of temporal continuity is created by use of object distortions such as "squash" and "stretch". These distortions can be effected by a human animator because he/she has a complete understanding of what the objects are and how they would appear for given motions. This complex understanding is not generally available to computer animation systems.

Objects are simply unclassified data for the computer. Thus, the animation system requires a mathematical definition of how an object changes through time. In the present invention, a method for achieving this mathematical definition is through the use of parametric equations.

Figure 4:
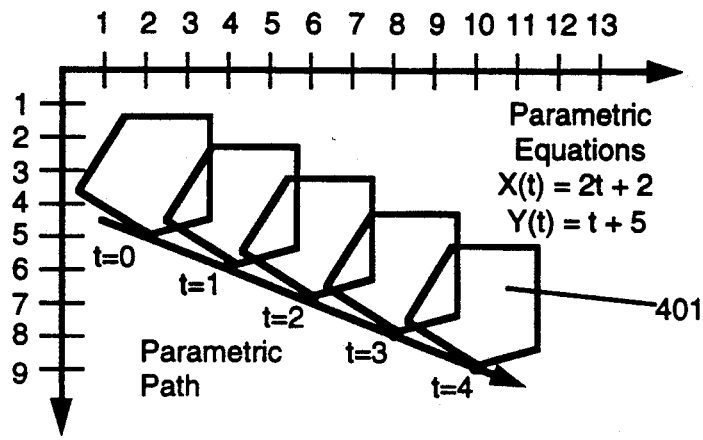
FIG. 4 illustrates a parametric path used to describe movement.

There is a parametric equation (which can be specified as a script or a compiled data structure) in time for every time-variant parameter of an object. We call this equation a parameter path. It is intuitive to see how a path can apply to positional parameters such as the vertex of a polygon (see FIG. 4), since the application of the path to the positional parameter through time causes physical motion along a path through space. It is less obvious to see how a path applies to a non-positional parameter such as color. But nonetheless, it is a useful model for the modulation of a parameter (e.g. hue or intensity for color) through time. A parametric path for modeling the movement of an object is illustrated in FIG. 4.

Continuity in 2½D computer animation (e.g. cel-type animation) has been traditionally achieved through keyframing methods. Essentially, a set of discrete animation keyframes is defined or initially provided to the animation model, along with an equation specifying a means for interpolating between keyframes (usually a cubic spline). The present invention defines an animation in terms of discrete parameters instead of discrete keyframes so that the animator has control of the object continuously, not just at moments in time. If an animator does not want any more control than keyframing provides, then a keyframe system can be implemented as a subset of parameter paths simply by applying a set of parameterized cubic splines for the path with the end of the spline resulting in what would have been the keyframe. A suitable editor to create and modify these splinal paths can provide an environment for an animator which is functionally equivalent to that of a keyframe animation system, but nonetheless creates parametric paths as its resultant output.

An editor to create and modify these paths for the specification of animation is beneficial. Such an editor is provided by a tool to manipulate a 2D graphical representation of a path for each parameter (direction, color, etc.) versus time. The animator is able to freely move between path specification and a 4D viewing of the animation. A library of parametric equations is available to the editor to aid in the creation and manipulation of paths. These equations could either be viewed and edited via the editor, or manipulated directly. In this way, those who are more comfortable working within the mathematical domain will have the ability to do so.

Object Interactions

One of the characteristics of an object-based animation system is that each animated object is independent and isolated from the other objects. In an environment where objects interact with each other, a protocol must be established for the objects to communicate. Because interactions occur in space across intervals of time, the present invention includes a communication methodology which works in a space of interaction for an interval of time.

The following sections discuss the nature of object interactions within a single interval of time and interactions over several intervals of time.

Affect Volumes

Figure 5:
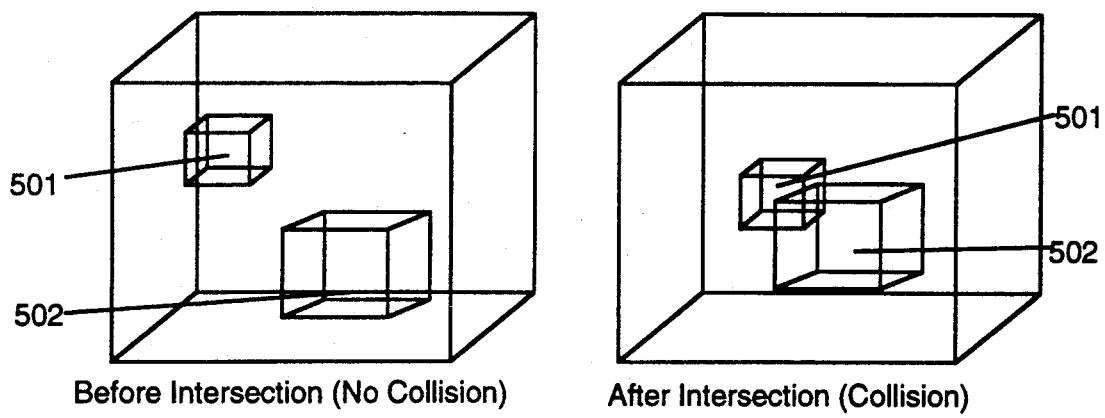
FIG. 5 illustrates an affect volume for an object.

Although an object can have very complex interactions with other objects, in general there is a limited range in which interaction is relevant. For example, a mechanical collision interaction with another object can only occur within the range of the object's physical extent in space. We say, then, that for a particular interaction, an object has a range of interactivity which is delineated as a volume in space. We call such a volume within the present invention a volume of affectation, or an affect volume. FIG. 5 depicts an example of affect volume for two cube-shaped objects.

An affect volume may be the exact volume of an object's physical extent, as is the usual case in mechanical collisions. However, there are many interactions, even some types of collision, for which the affect volume is different than an object's physical extent. Consider the case of two magnets approaching each other with opposing poles: the collision occurs before the objects actually touch so the affect volumes of these objects must be larger than their physical extents. In fact, an object may have a space of interaction that is equal to the entire world space. For example, a camera that looks at the entire world would need an affect volume that delineates all of World Space. We call this volume the World Volume. An object will usually have several different affect volumes, one for every different spatial delineation of the object. Some objects contain an affect volume which is nil and will not intersect with anything. Such an affect volume is called an empty affect volume. An empty affect volume may be used to indicate that an object is not participating in the interaction associated with the volume. This is a useful way of making objects oblivious to certain types of interactions for one part of the animation and aware of them during another part.

Figure 6A:
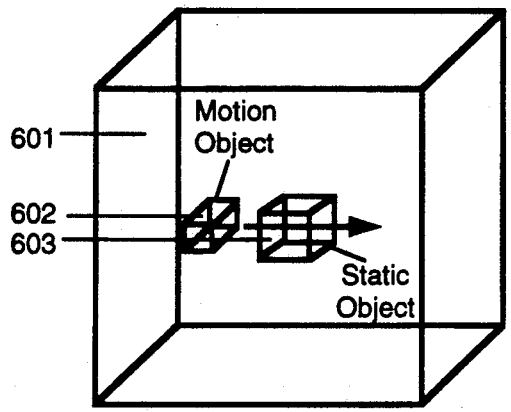
FIGS. 6a–6d illustrate the interaction between two objects.
Figure 6B:
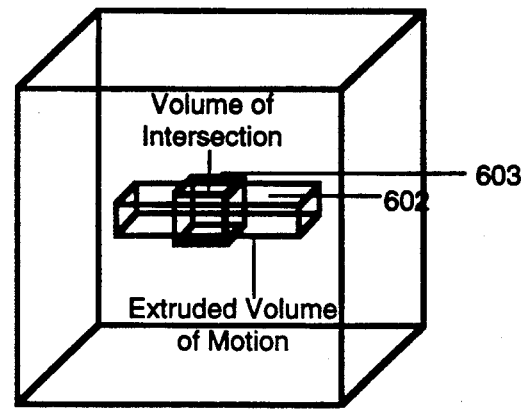
Figure 6C:
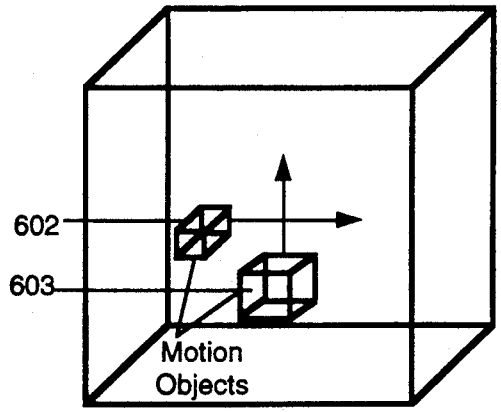
Figure 6D:
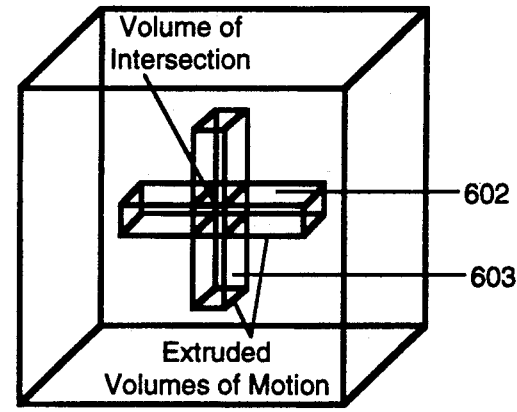

An affect volume covers a continuous range of space, but in order to maintain the concept's generality, interactions between it and other affect volumes must be evaluated across an interval of time. If we consider interactions without regard to time (e.g. evaluate collisions at instants rather than intervals in time), then we run the risk of missing or misinterpreting interactions. For example, a rapidly moving object may collide with another object, but because the collision falls between instants of evaluation it is missed. A more general method of evaluating a mechanical collision of an object moving through space is to use an affect volume which is the object's physical extent extruded along its path of motion for that time interval. Thus, an object's affect volume may change over time. For example, the affect volume of an accelerating object would elongate along the path of motion over every time interval. An elongated affect volume is depicted in FIGS. 6a–6d. Such an affect volume comprehends the potential interaction of an object through space across the entire intervals of time. FIGS. 6a and 6b illustrate the interaction between objects using the elongated affect volume technique where only one object is moving. FIGS. 6c and 6d illustrate the technique where both objects are moving.

Clearly, this system of interaction detection is only as precise in time as the resolution of the time intervals. This is because an affect volume reflects the aggregate volume of affectation across an interval of time. If an entire interaction occurs within a time interval, then it is possible that the interaction may be misinterpreted. Consider the distinction between evaluating the collision of a fast moving object with a static object (FIGS. 6a and 6b) and of two fast moving objects with each other (FIGS. 6c and 6d). In the first case, if the extruded affect volume of the object in motion crosses the affect volume of the static object, we are guaranteed that a collision has occurred. In the second case, even though the extruded affect volumes of the two objects in motion intersect, we are not guaranteed that they actually have collided; one may have passed in the other's wake without incident. Therefore, the present invention subdivides an interval of time when it recognizes that too many interactions are occurring within that interval. This is best done on an object by object basis. Only objects that are moving very quickly or interacting with many objects in a single interval may require the subdivision of time. This compensation for lost accuracy can also be controlled by the application if it understands which objects will be more active over a given interval of time.

Affect Agents

Figure 7:
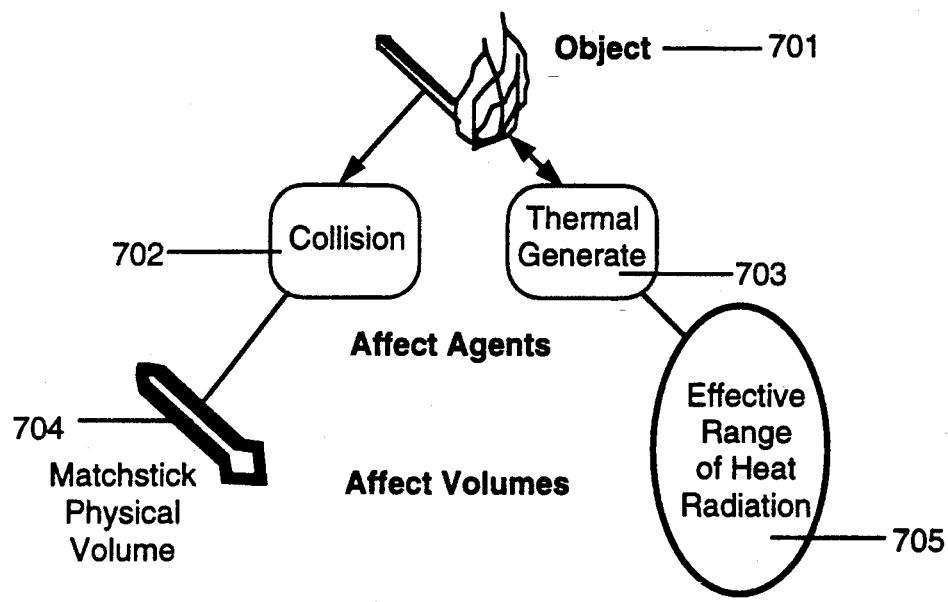
FIGS. 7 and 8 illustrate an object with its associated affect agents and affect volumes.
Figure 8:
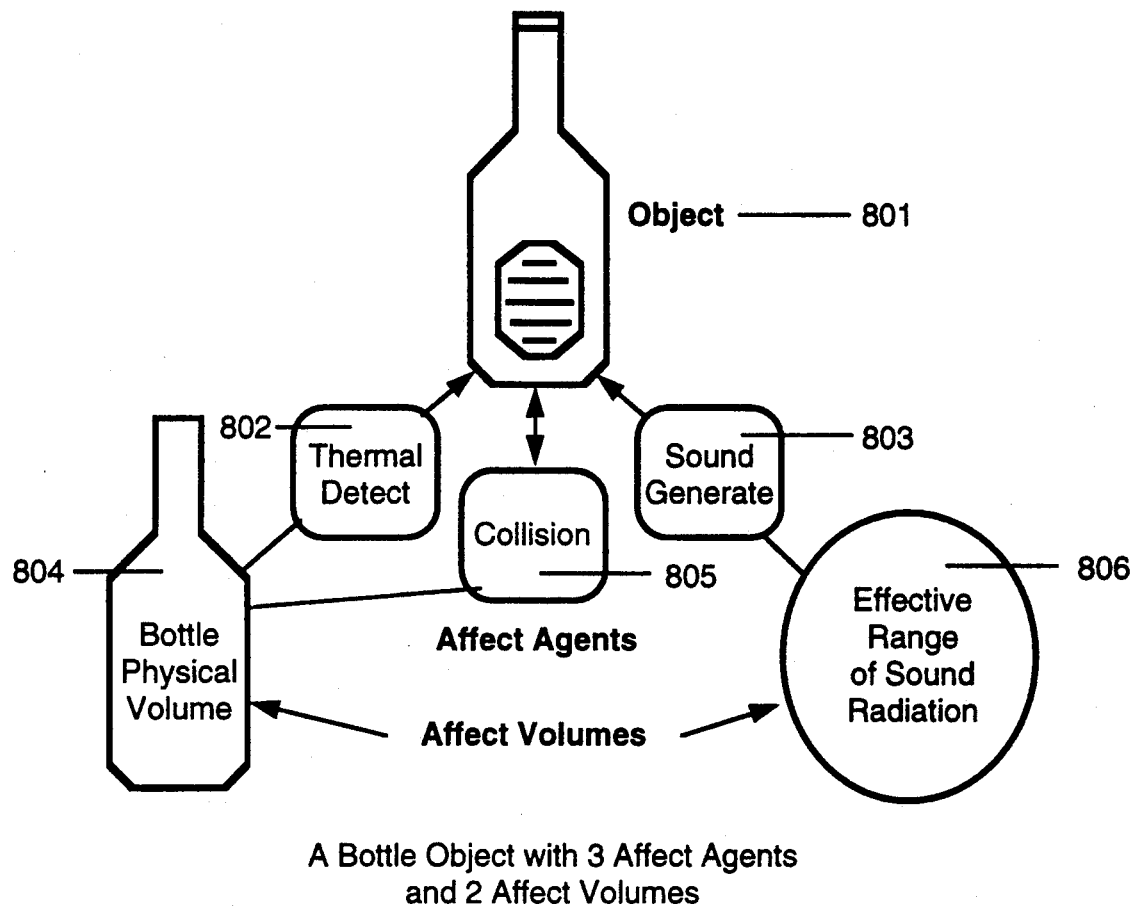

When affect volumes intersect, the resulting interaction is handled by affect agents. An affect agent is a component associated with an object that handles the external communication for interactions with other objects. An object may have many different affect agents, one for every type of interaction in which it can participate. For instance, an object may have an affect agent for collision, one for temperature detection, and another for sensitivity to sound. When an interaction occurs between two or more objects (i.e. their affect volumes intersect), there is an exchange of information between the object's affect agents for the given type of interaction. In the case of a collision, the exchange of information occurs between the two collision agents. Each affect agent inputs and outputs information about the object relevant to the particular interaction for which that agent is responsible. FIG. 7 and FIG. 8 illustrate an object with its associated affect agents and affect volumes.

Figure 9:
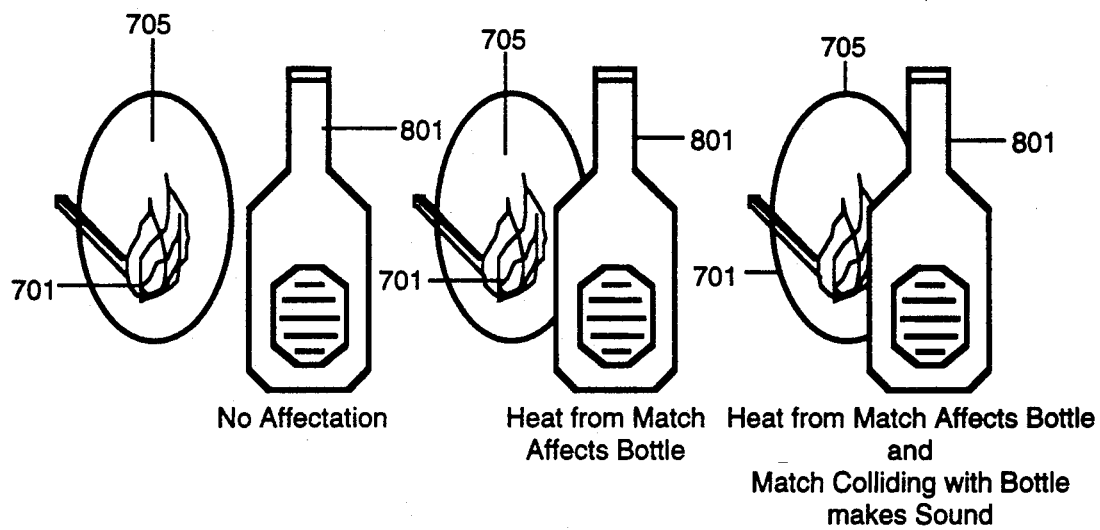
FIG. 9 illustrates the interaction between two objects as related to their affect volumes and affect agents.

An affect agent refers to an affect volume which delineates the range of affectation for the particular type of interaction for which the agent is responsible. For example, if an animated object is a bottle of soda, there may be an affect agent for collision which uses an affect volume precisely the size and shape of the bottle (extruded along the path of motion) indicating the region in which collisions are relevant. This same volume can be used to delineate the space that temperature detection is valid. The bottle may have another affect agent for sound radiation that refers to an affect volume larger than the actual size of the bottle. The range of affectation for radiation types of interaction (e.g. light, sound, temperature, magnetism) while, in theory is infinite, in practice is limited to some range beyond which the radiation is at a lower level than ambient noise. For example, a bar magnet's magnetic field has an infinite extent, but beyond some limited range has less effect on another object than the Earth's magnetic field. Consequently, radiation affect volumes, though really infinite, can be limited to some practical range. A clearer example may be the modeling of a microphone. As in the case of the bottle, the collision volume is the volume of the whole microphone. However, the sound receptor agent would have a volume that delineates a space around the head of the microphone. An affect agent also uses input and output properties that are relevant to its type of interaction. These properties are usually a subset of the complete set of properties that describe an object. In our example of a bottle, the collision agent might use properties like the mass of the bottle and its current velocity, while the temperature detection agent might use properties like the atmospheric temperature and pressure. Finally, an affect agent contains a response method or method of interaction that determines the appropriate reaction to an affectation. For our collision affect agent, the method might determine if the bottle moves or breaks. The temperature detection affect agent would determine whether fluid in the bottle freezes or boils upon a temperature affectation and whether the glass cracks from a sudden change in temperature. FIG. 9 depicts the interaction between two objects.

There are three basic kinds of interactions that can occur between affect agents: symmetric, asymmetric and exclusive. A symmetric interaction is an interaction between agents that requires satisfying the same input and output parameters in each agent. There is an identity between the input and output parameters for agents in a symmetric interaction. Collisions, for example, are typically symmetric interactions because the objects involved will require input such as the forces being applied and will also output the forces they are contributing to the collision.

An asymmetric interaction differs in that the input and output parameters of one agent may be completely different than the input and output parameters of the other agents. Indeed, not all affect agents involved in asymmetric interactions need have both input and output. An interaction involving temperature is an example of this type of interaction. The bottle in the previous example has a temperature sensitive affect agent that expects to receive the temperature source being applied as input. If a match were being held near the bottle, the match's temperature radiation affect agent would interact with the bottle's temperature sensitive affect agent and would output its specific heat. There will be more examples of asymmetric interactions presented later in this detailed description.

The third type of interaction is an exclusive interaction. Exclusive interactions provide a means for preventing interactions from occurring between affect agents of a given type while allowing interactions to occur between affect agents of a different type. For example, two light-emitting objects interact with a bottle object by illuminating the bottle. However, the light-emitting objects do not interact with the light emitted by each other. Thus, in this exclusive interaction, affect agents interact with other affect agents while not interacting with each other.

The Interaction Manager

The intersection detection of affect volumes and the management of affect agent interaction is handled by the Interaction Manager (IM). The Interaction Manager is the moderator for inter-object communication. It keeps track of all active affect agents and the current locations of their volumes within the World. When two or more affect volumes of compatible affect agents intersect, an interaction has occurred. The Interaction Manager's function is to effect and monitor the exchange of information between agents. An agent's method of interaction may use the received properties to determine the correct response to the interaction (e.g. change direction or motion, shatter, etc.). Depending on the nature of an interaction, an affect agent may need to execute its method of interaction before it can generate its output properties. The Interaction Manager initiates the interaction and then allows the agents to communicate directly via a multi-tasking operating system call or programming language construct. In an alternative implementation, the Interaction Manager receives the input/output sequencing requirements from the affect agents for a given type of interaction so that it can properly moderate the exchange of data between affect agents. The Interaction Manager cannot satisfy the requirement of two interacting objects that both need input before they provide an output. Such a situation constitutes an error.

Sometimes objects may need certain global information in order to execute their methods of action or interaction. For example, it may be necessary for an object to determine its distance from another object. Because objects operate within local frames of reference, they have no information about another objects' relative position in the world. The Interaction Manager can be queried by an object to obtain this type of global information.

In being responsible for detecting and effecting all object interactions, the Interaction Manager is the focus of control for the World model. Since intervals of evaluation for interaction may vary from object to object and affectation to affectation, the Interaction Manager must maintain World Time and time-keeping functions. Since the Interaction Manager must preserve the spatial relationship between objects in order to determine affect volume intersections, it must also maintain World Space (the limits of the space that the Interaction Manager must monitor, possibly defined to be the user's view volume).

User Interaction with Objects

One of the objectives of the present invention is to provide a system that easily supports interactive animation. Interactive animation is one in which the user can participate. Multimedia education applications and video games are the most common examples of interactive animation. Typically, a user will interact with objects in an animation through some input device such as a keyboard, mouse, or joystick. In the present invention, input devices are simply treated as objects with the same definition and constraints as any other object. Each input device has an affect agent with an affect volume, properties, and a method of interaction. In the most common case, the affect volume is the World Volume, indicating that the input device has continuous interactions with all objects that are receptive within the entire World Space. There is one set of properties for output, and potentially one for input if the device has a feedback mechanism. For example, a typical animated object contains an affect agent associated with a function button (signal generation device) on a mouse or other cursor control device coupled to the computer system. This agent controls the interaction of the object with the user while the mouse function button is activated (MouseDown).

Let us consider the example of a video game that has a single user object: a car, that the user controls with a joystick. The joystick has the World Volume (so that it intersects the car no matter where it is located in World Space), a set of output properties containing positional information about the joystick, and a method that retrieves this information. The car object has a receive-joystick affect agent. The receive-joystick affect agent would also have the World Volume, input properties to receive the positional information, and a method that determines the appropriate reaction to this information. When the joystick is moved, the Interaction Manager determines that an interaction has occurred and output from the joystick's affect agent is passed to the car, controlling its motion.

The Model in Action

Figure 11:
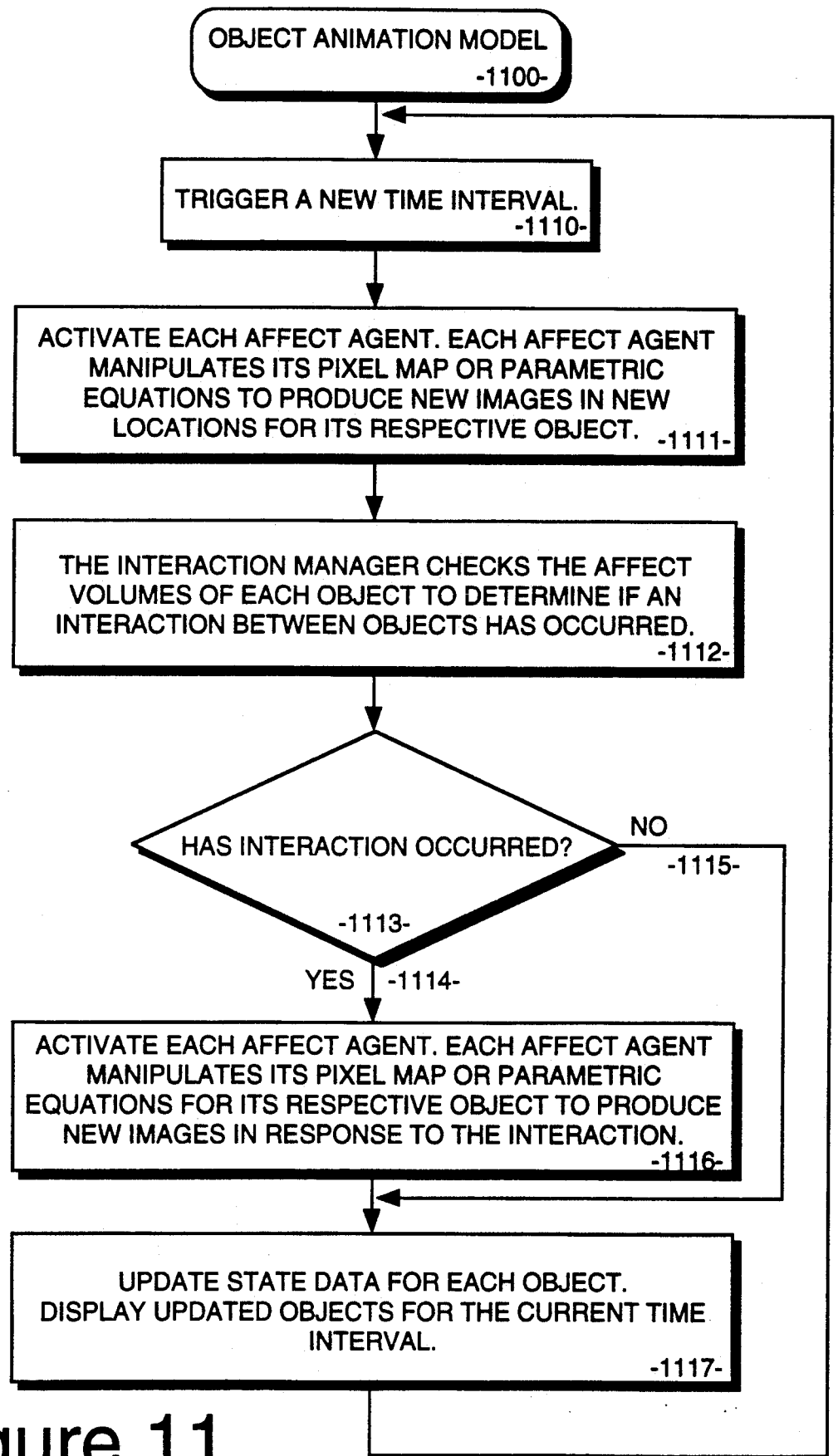
FIG. 11 illustrates the processing flow for animated objects.

As described above, the concept of an object for animation is established. An object is designed, in its own local time frame of reference, to have state and behavior characteristics that determine the actions the object may perform in an animation. Every object has a collection of agents that represent it to the World. These agents determine the interactions in which the object may participate and the extent to which they participate. The agents are registered with the Interaction Manager that controls the activation of agents in response to an interaction. A typical processing flow for the model in action is depicted in FIG. 11.

The following sections describe how this definition of an object with its associated affect agents and affect volumes can be used in action to model more specific objects such as input and output cameras, lights, and sound.

Cameras and Lights

Camera and light models are an important part of displaying a visual image of objects. The present invention supports cameras and lights as two standard types of objects within the system. Each type of object operates within the same constraints and mechanisms as any other object. Each uses affect agents and the Interaction Manager as a means of communication.

A camera is a lens through which the user views the World. A camera has a position and an orientation in the World that determines the distance and perspective from which the user views other objects. A camera also has characteristics that determine, among other things, the aspect ratio of the virtual focal plane. With this information about the camera, it is possible to construct a volume in space which delineates the image portion of the world that is captured on the focal plane of the camera. This volume is often called the view frustrum. Objects within this view frustrum are visible to the camera.

Visibility is treated as an exclusive interaction between objects that have vision (cameras) and objects that are visible. All visible objects that participate in this interaction have associated affect agents that interact only with affect agents that have vision. Objects can decline to participate in this type of interaction by not having the associated affect agent (or having an agent with an empty affect volume). Such objects will be invisible. (Note that an object's affect agent for visibility can only interact with the affect agent of an object that has vision, not with affect agents of other visible objects.) When an affect volume of a visible object intersects with the affect volume of an object with vision, an interaction has occurred. Positional information, as well as "film" type and other properties that affect rendering is collected by the vision affect agent's method of interaction and passed to the intersecting visible object's affect agent. The visible object's affect agent would then execute its method of interaction to determine the object's appearance from the camera's point of view (POV). This data is passed back to the vision affect agent. The camera object does all of the compositing of the image.

Lights are the source of illumination in any scene and are necessary if objects are to be viewed. To realistically model an environment, three different kinds of light are needed: ambient, point, and distributed light. Ambient light is light that impinges from all directions, constantly illuminating all objects, regardless of their orientation. Ambient light by itself produces unrealistic images, since few real environments are illuminated solely by ambient light. A point source is a light that has a position and orientation that determines the amount of illumination striking an object. If a surface is normal to the light rays, the surface is brightly illuminated. The more oblique the surface is to the light rays, the less the illumination. Point light sources are often used to represent a spot light or an incandescent bulb. A distributed source is much like a point source except that the light has no origin in space. Instead of representing light as radiating out from a single point, the light is radiated from a position independent direction. The effect is that the light rays all travel in parallel. This is useful when one wants to represent a bank of lights all as one object, or to represent the natural effects of sun light.

Light rays may be bounded, as they are from the beam of a flashlight, or they may radiate throughout an entire scene as they do from ambient light. Both of these situations can be modeled using affect volumes. The light source is an object with a lighting affect agent. This affect agent has an affect volume which defines which region of space is illuminated by the light source. In the case of a bounded beam of a flashlight, for example, the lighting affect volume is a cone emanating from the "light bulb." In the case of ambient light, the affect volume is the World Volume; because, it affects all objects responsive to light. Each object that is responsive to light has a light receptor affect agent. When the affect volume of a light receptor affect agent intersects the affect volume of a lighting affect agent, an illumination interaction has occurred. The light source executes its method of interaction to determine the characteristics of the light reaching the object (for example, the light may not be as bright if it is travelling a long distance), and passes this information, via the Interaction Manager, to the illuminated object. The illuminated object evaluates how the light affects its visibility (for example, by altering its color) and modifies its appearance for visibility interactions. This is a situation where the order in which interactions take place has relevance. An object needs to calculate the effect that a light has on its appearance before it renders itself. Light receptor affect agents only interact with lighting affect agents and not with each other. This is true in an exclusive interaction. The affect agent model can be used to accomplish even more sophisticated lighting effects such as shadows and diffuse light (from haze, for example).

Sound

Objects may make a variety of sounds while performing actions. However, it may be desirable to make the generation of sound dependent on object interactions. The present invention supports sound interactions with the same level of sophistication and generality that it supports light, utilizing the same model as all other object interactions. An object generates sound through a sound generator affect agent. An object receives sound through a sound receptor affect agent. When the affect volume of a sound generator affect agent intersects with the affect volume of a sound receptor affect agent, a sound interaction has occurred. Information regarding the sound is passed from the sound generator to the sound receptor and the sound receptor executes its method to respond to the sound. In the example of an object which generates a sound to be heard by the user, there is an object with a sound receptor agent that sends the sound to the system's speaker. In the more sophisticated example of generating stereo sound for the user, there are two sound receptors at different locations in the World, each of which produce sound data for one of the system speakers. Clearly, stereo sound is meaningless if both sound receptors receive the same sound information. Just as light becomes less intense over a distance, sound energy gets less intense over a distance. This can be modeled in sound interactions, providing different information to each sound receptor.

The object model of the present invention supports more sophisticated sound interactions than just providing multitrack sound output. Objects can have sound receptors that have nothing to do with audio output, but allow them to respond to sound generated by other objects. For example, a dog object may have a sound receptor affect agent that causes the dog to respond to a whistle or the sound of his name. Also, objects that have sound receptors can have active physical representations, as in the microphone example described above. The flexibility of this model allows sound to be intuitively associated with an object from the object's inception.

Object Representation

In the present invention, an object is composed of two basic parts: state and behavior. The state includes a collection of properties, a physical description, and the local frames of reference. The properties are part of the collection of data that is needed to give the object its character. An affect agent also uses properties from this set that are relevant to its interaction. For example, an object's weight, color and material composition are all types of information that is considered a property. The collection of properties define information including temperature and other non-physical qualities as well. The object's geometric description is defined descriptively (e.g. material artwork) and/or numerically (or geometrically).

The behavior of an object is represented in a collection of methods. A method is implemented in a computer model as a function, subroutine or procedure or a plurality thereof. These methods are definitions of action, not interaction. The methods of affect agents handle interactions. Methods contain programming logic defining the actions an object should perform if it is to crack, move, boil, generate sound, etc. The execution of this behavior method logic is initiated by an affect agent method. As described above, each affect agent has a method which resolves all interacting forces for a particular affectation, and determines what action is to take place. In the soda bottle example described above, if the forces striking the bottle were great enough, the collision affect agent would recognize the fact and signal the bottle to execute its method to break itself.

One important feature to note is that each object is capable of executing methods of action that modify itself. However, the object is not required to have information about the events that can cause this action. That information is determined by the affect agents. For instance, the bottle can break because it was struck or because the temperature dropped. To the object, the cause of the action is unnecessary information as long as the object can be signalled to break itself. The resultant effect is that an animator can create a character (object) that has the ability to perform many different actions upon itself. The causes leading to the performance of these actions is irrelevant. Likewise, the animator does not have to be concerned about the effect her character will have on other characters in the scene.

The affect agents provide rules (defined as methods that resolve interaction data) that govern the behavior of an object, given its current state. Affect agents do not need to be associated with objects until animation time. If implemented correctly, these agents should be simple to create and associate with the objects so that the process of creating a unique animation environment will simply be a modification to the basic rules that govern the animation.

Descriptive vs. Analytical Representation

An object in the present invention can be geometrically defined either descriptively or analytically (mathematically) or both. A descriptive definition is a collection of one or more pixmaps (two-dimensional or three-dimensional array of pixels describing the lighted or unlighted condition of display elements comprising the object) that give different views of an object. These views may be used to create frames which represent a succession of states of a character. The frames can then be incrementally displayed much in the fashion of traditional frame animation or flip books. Unlike frames used in traditional methods of animation, the pixmaps of the present invention are defined to be texture-mapped onto an arbitrary plane, providing additional flexibility. If the animator is only interested in simple frame-type animation, the plane simply defaults to a plane orthogonal to the Z-axis (parallel to the display screen plane) and conventional 2½D animation results. Multiple renderings of an object from a variety of POVs can be defined and stored so that a camera can move freely through a scene and the appropriate 2D view can be displaced in real-time. Interesting distortions can be conceived by mapping these views into extruded spaces.

The analytical or mathematical definition is simply a collection of points and edges or splines that specify an object in two-dimensional space (two-space) or three-dimensional space (three-space). Points will normally act as controls to which parameter paths can be applied. For example, see FIG. 4 which shows the parametric path (through time) of a vertex of a pentagon. The points can also be modified in real-time in response to interactions with other objects.

We have indicated that both the descriptive and analytical representations can be useful for a single object. While it is often useful to define a geometric object analytically in three-space, on slower machines it may be physically impossible to compute a rendered view of this object in real-time. In this case, the animator may elect to have the computer precompute a collection of different views for every analytical object along the paths the user might traverse. The problem then simply becomes a matter of determining which view is closest to the visible view of the object at a moment in time, and displaying the selected view in real-time. Another useful scenario is when the host computer is fast; but, the animation contains many characters. As long as a character is in the background it may suffice to use its 2D view. For instance, this dual representation technique may be illustrated using the soda bottle example described earlier. The soda bottle in this example may be displayed as it rests on a shelf in a grocery store. A simple 2D view of this bottle could be displayed as long as shoppers are walking around the store and not interacting with the bottle. As soon as a shopper reaches to pick up the bottle the shopper's affect agent of collision and the bottle's affect agent of collision intersect. Upon collision, the analytical definition of the bottle is used instead of the descriptive definition. Thus, the full power of the analytical model can be activated when necessary.

Controlling the Animation

We have described objects and their agents and the fact that they determine the actions and interactions which take place in an animation. The Interaction Manager was described as the component that monitors and controls all interactions between objects and maintains World Time and World Space. Additionally, the concept of parameter paths was described as a means of animating any parameter of an object in time. Finally, objects have been defined to have both descriptive and analytical representations, each representation being used for a different type of action. The following sections specify how all of these variables are controlled within the animation environment. In the present invention, three different methods for controlling an animation are provided: rules, state graphs, and scripts.

Rules

Rules specify the behavior of an object given particular physical constraints. For instance, a rule would specify how an object would respond if a force were applied to it at a given point. For example, see FIG. 4 which shows the parametric path (through time) of a vertex of a pentagon. Rules in the form of equations define the behavior or movement of the pentagon. Rules are encompassed in the definition of an affect agent. Each agent specifies a rule for an object. An agent's input parameters are those that are needed to solve the rule. The method is the actual rule that determines the behavior of the object.

The Interaction Manager detects (by calculating intersecting affect volumes) whether there is an interaction occurring between two objects. If there is an interaction, the corresponding agents are alerted so that they can begin to communicate. The agent's properties contain the current state of the object. It is this information that is passed between the agents. In actuality, there is an entire message passing mechanism that exists to handle inter-object communication. A multi-tasking system is used to create and terminate processes, send messages between processes, and wait for messages and/or simulation time to elapse. Such multi-tasking systems are well known in the existing art. The rule methods are executed to determine the resultant action that the objects must take. This form of control relies on the fact that objects contain all information pertaining to interactions. It utilizes the architecture to the fullest because it is the system, not the animator, that must calculate the state of an object. This model is the most flexible.

State Graphs

Figure 10:
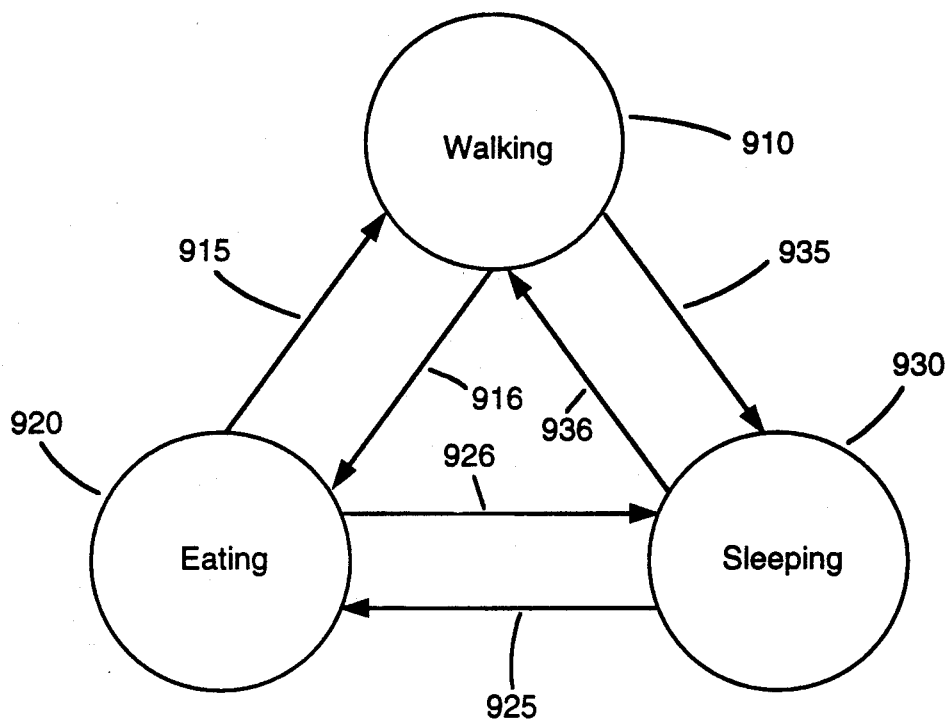
FIG. 10 illustrates a state graph for an object with three states.

A state graph is a data structure which defines the allowable transitions from one state of an object to another state. Each node on the graph is an object state, and each edge is a condition subgraph denoting particular state sequences (e.g. walking). For example, if an object can do three things, walk, eat, and sleep, the state graph would have three nodes (possibly represented by subgraphs) each corresponding to the three states and transitions defining how to get from walking to eating, from eating to sleeping, etc. Such a state graph is depicted in FIG. 10. The subgraphs 910, 920, and 930 associated with a state would contain a collection of images that represent the action of the object in the respective state. The word images is used here to imply either a descriptive representation or an analytical representation that has a particular state at a given time (i.e. every parameter that changes has a set path of motion to describe it over time). The number of images for a subgraph is arbitrary. Eating may require 40 frames to be accurately represented, while sleeping may only need ten.

Transitions 915, 916, 925, 926, 935 and 936 can either be a sequence of images that connect the motion of one state to the motion of another, or can simply be a neutral position image that the motion must reach before it can move to the next motion. Although a state graph's transition across an edge may rely on a condition derived from an interaction, state graphs, in their more general sense, are defined outside of the affect agent rule mechanism. State transitions may rely on no more than the tick of World Time to occur, and consequently can be applied quite usefully to objects with no affect agents at all.

The concept of a state graph is a very powerful tool, for it is a way to create reasonably complex interactive animations at a very low cost. A state graph can be created that has an initial state sequence (e.g. sleeping), and then, upon user input, effects a state change (e.g. to standing). In cases where the data to be animated is descriptive and not mathematical, state graphs are a simple way to sequence artwork in a controlled fashion. Although powerful, the use of state graphs is not required by the present invention.

The present invention provides the ability to create state graphs and interpret them correctly. A state graph can contain the entire animation that is read and sequenced by the Interaction Manager. A state graph can also define the animation of a single object within a larger animation. In the preferred embodiment, such a state graph is a subpart of the object and each state sequence is executed when needed. An object state graph is logically a method of action that has a descriptive definition of action instead of a mathematical definition. In this way, image representations that are computationally inexpensive can easily be combined with objects that are mathematically defined (and potentially expensive).

Scripts

A script is a special purpose animation language used to control objects in an animation. As in conventional programming languages, an animation language provides procedural control over the elements defined in the language. In the case of animation, the elements defined in the language are the objects in The World. Scripts, like state graphs, are control structures which do not rely on affect agents or a rule mechanism. They provide direct control to the animator of the objects of the animation without necessarily depending on object interactions to drive the sequencing.

Traditionally, scripts have been used to do simple keyframe animation. Keyframes represent a succession of views of an object. Intermediate frames (inbetween frames) can be interpolated from keyframes. The scripting language sequentially specifies the graphics operations to be applied to objects at given keyframes, and the interpolation methods to use in calculating the inbetween frames. A scripting model allows simple expansion to provide additional flexibility. A scripting language is easily extensible and can sometimes incorporate new ideas more quickly than the rule-based model. An example of an existing scripting language adaptable to the animation model of the present invention is the XCommand component of the Hypercard TM system, developed by Apple Computer, Inc., Cupertino, Calif.

A scripting language is employed in the present invention to define the behavior of objects. Scripts can be encapsulated into an object as well as existing as an external controller of objects. Internal scripts will be used to control subpart movements of one character. External scripts will be used to control the movements of one or many objects. Used together, scripts will be able to direct a complete animation, while still separating specific object behaviors from the overall choreography.

Sophisticated control structures like loops are included so that keyframes can actually be calculated within the script. An extension of this concept allows loops that have dependencies on the animation. Thus, a next frame of animation can only be calculated by inspecting the current frame to determine if a resultant condition has occurred. This resultant condition can be interaction dependent. The result is retrieved from the Interaction Manager or from the affect agents themselves. By providing a mechanism for scripts to query affect agents, the present invention supports input/output (I/O) communication from within a script (user interaction is achieved via affect agents). This provides the flexibility necessary to make the scripting system interactive.

The script language of the present invention includes commands that are "evaluative" by nature such as loops, variables, and "if" statements. This allows scripts to both respond to user input and to react to the state of other objects.

The scripting system of the present invention employs some of the concepts of higher level languages like simple FOR loop constructs. By adding animation specific queries (e.g. collision tests) to loops, the present invention exploits the power of the DO WHILE and DO UNTIL constructs, adding a new semantic extension to scripts. For example, objects can be instructed to perform a task WHILE time is less than t or execute a collection of paths (that specify positional location, color, material, etc. for every frame) UNTIL the object collides with another object.

A key to being able to have interactive script animations is to allow input from the user into the script. This means that the entire script cannot be precomputed. In the preferred embodiment, a script is compiled into an executable program that can then request input from the user. In many ways, this relates back to the state graph in that the script's primary importance is to handle transitions from input to input. The difference is that the frames are not precomputed, but created depending upon user input.

Users can create scripts directly or by using an application. Applications can aid users by hiding the scripting language with a more interactive interface. Applications may want to bypass writing the scripts "longhand" by generating "compiled" scripts or C++ code. Compiled scripts are still editable directly; but, the command will have to be specified by numeric codes instead of text to enhance performance. The implication is that all three types of control (ASCII scripts, numerically coded scripts, and C++ code) will be able to coexist within one object.

Below are some sample script commands with their associated parameters:

| | |
|---|---|
| Get<object type> <name> | Creates an instance of the named object, giving it its working name. |
| Move<name> to<position> <by,for> <time> | Moves named object to location. |
| Interpolate<property> using<interpolate> | |

-continued

| | |
|---|---|
| Walk <name> to <position> <by,for> <time> | Use interpolate to tween for property (default linear). |
| | Moves names object to location using the walk behavior. |
| Run <name> to <position> <by,for> <time> | |
| | Moves named object to location using run behavior. |
| Color <name> <colorvalue> <by,for> <time> | |
| | Change named object color. |

In this sample scripting language, two different kinds of commands exist. The first three commands (get, move, interpolate) are commands that can be issued to any object. All objects have constructors (called by the get command), and a physical location (modified by the move command). Different interpolants (e.g. linear, splined) can be used to calculate inbetween frames for any property (e.g. location, color, size). The last three commands are object specific, addressing behaviors that exist in a particular object. When an object is created, new behaviors may also be created and installed as a command in the language. For these behaviors to be addressable by a script, the creator must add the new behavior to the scripting language.

An Example of Rules, State Graphs, and Scripts

Animation control becomes complex when the different methods of control (rules, state graphs, and scripts) are combined into one animation as may be performed in the present invention. The best way to illustrate this combination is by giving an example. The following example is a physics experiment that shows the interaction of two atoms. For the purpose of the experiment, it may be effective if the atoms shimmer to imply the constant orbital motion surrounding them. This shimmering effect could be achieved quite effectively using a state graph sequence that cycles through images of the atoms that show a slightly different amount of radiance around the core. To accomplish this effect through a rule-based lighting model is very expensive and complex. However, the actual interaction of the two atoms must simulate the laws of physics accurately. To do this, the atoms would need agents to define the rules that they obey during the interactions. Finally, the user may want to set up several different experiments, each giving the atoms different starting locations and velocities. A script is best to initialize the simulation state for each experiment. The experiment could then run for a specific period of time or until an interaction is completed.

This is a simple example, and its portrayal is certainly not the only way this animation could be created. The entire simulation could be achieved in a rule-based model. The shimmering effect could be achieved using scripts. The example is provided to show the power and flexibility of a model where the objects are generally responsible for creating actions; but, external controlling mechanisms can be applied to the objects when convenient.

Processing Logic of the Present Invention

The following section describes the animation program logic and implementation details of the present invention. The Underlying Services section describes some system level services or functions necessary to support animation. The present invention utilizes the underlying services for storage, compositing, and display of objects or images. The User Interface and User Functions section covers input/output (I/O) related issues. Animation Editors section describes the basic editors necessary to create animations.

The present invention is implemented in C++ is providing fully overridable and extensible classes. The use of classes in C++ is a well known technique in the art. C++ classes are most appropriate; since, the present invention is designed around the idea of animated objects. Objects associate well with C++ classes.

Underlying Services

Object Storage

A database is used to store animation objects with their component parts. For example, a 3D animation object has a 3D model associated with it, as well as behavior and motion scripts. A pixmap object or 2D object may have several pixmaps associated with it. Note that in some cases, component parts of an object can be shared between several animation objects. This sharing saves memory (and disk space), instead of having several identical objects.

Compositing

Compositing is the process by which a frame of animation is assembled from its constituent objects. There are three methods of compositing supported by the present invention:

1. Simple Layered Compositing

In this method, each object draws itself into an off-screen buffer. The buffer is then copied to the screen. The objects are drawn in back to front order (but only those objects that have changed since the last frame). This is the best method for high-speed real-time interactivity.

2. Z-Buffer Compositing

In this method, there is both an off-screen graphics buffer, and an associated "Z" buffer. The Z Buffer gives the limited Z coordinate location of each pixel that has been drawn. When new objects are drawn into the graphics buffer, only those pixels of the object that are nearer in Z are actually displayed (and their corresponding Z value put into the Z buffer). Objects do not need to be drawn in back to front order. This is a better method for 3D animation than simple layered compositing. This method allows for concave, interpenetrating objects; but, it takes more processing time and memory.

3. 3D Database Rendering

In this method, there is no off screen buffer. Instead, each object adds itself to a 3D "database" for the given frame. Any of several 3D scene renderers can then operate on the 3D database to produce a complete image of the frame (the entire frame is rendered at every frame, even if only a small part of the frame has changed). This gives the most realistic 3D imaging (cast shadows and so forth), but is the least real-time responsive approach.

Compositing is controlled by a compositing manager. This compositing manager has a list of the objects in its view, and controls their imaging onto the screen. The imaging is oriented from a point of view or point of reference (grafport). A "camera" associated with a grafport affects how the scene is constructed. Information about camera position is passed to the objects when they draw themselves. The camera is able to "pan" across a 2D scene, and move freely in a 3D scene. The same is true of lights.

Display Services

Animation objects use well known graphics methods to render themselves as 2D, 3D, or other (e.g., video) images. These methods are used in compositing to copy objects to off-screen buffers, and to copy off-screen buffers onto the screen.

Video Services

Video can be treated as a special type of animation object which draws itself by displaying frames of video. In this way, an area of video can be added to and coexist with an animation. The area of video can even be moving around, or have other objects move on top of it, just like any other object in this environment. However, if the video is going through the compositing buffer this might cause enough slow-down in speed to consider skipping the compositing and going direct to the screen. By skipping compositing, effects like animation objects moving over the video will not be available. Either option, however is provided.

Video will also be used as a method of recording and distributing animations. For non-real time (or "near-real time") animations, video will be used to achieve real-time performance by computing the frames and recording them frame-by-frame.

Having described the underlying services provided by the present invention, the following sections describe in more detail the components of an animated object and the environment in which these objects exist.

Animation Objects

An animation object is composed of a state which defines the status of an object at any given interval of time and behavior which defines the object's capabilities. Any entity that can be animated, or have an effect on another entity, can be derived from an animation object. These entities include characters, cameras, light sources, and even microphones. The objects are all derived from an animation object base class called TAnimObject. This base class is defined in C++. A TAnimObject has states that include current orientation (i.e. location, rotation) and current time (TTime), which is relative to a clock (TClock). Specific objects have additional states. For example, a character might have additional shape and property information. A light might have an associated direction and color.

A TAnimObject also has two guaranteed behaviors; the PrepareMeO method and PresentMeO method. PrepareMeO makes sure that the state of the object is evaluated for a given time. PresentMeO determines the presentation of an object given this updated state. A character might have a PrepareMeO that executes methods to calculate its current position and orientation and a PresentMeO that generates an image given this data.

Animation objects are registered with the compositing manager discussed above. At a given time, this compositing manager signals all of the associated objects to prepare themselves and then present themselves. Upon presentation, objects pass back images or other information about themselves (depending upon the compositor) to be complied into a final image.

Object Class Definitions

The following are some examples of the kinds of objects provided in the animation system of the present invention. The object example is presented in the C++ programming language. It is apparent to those skilled in the art that other programming languages could be used.

TAnimObject

```
class TAnimObject {
    TTime           fCurrentTime;
    TClock          fReferenceClock;
    TGPoint (3D)    fPosition;
    Interpolant     fMoveInterpolant;
    BehaviorList    fCurrentBehaviors;
    TAnimObjectO;
    ~TAnimObjectO;
    PrepareMeO;
    PresentMeO;
    MoveO;
    Interpolation(property, interpolant); }
```

The TAnimObject is a base class for all animation objects. Every object participating in an animation will be derived from this class. The PrepareMeO and PresentMeO methods are the general methods described above for all objects. The MoveO method simply assigns an xyz value to fPosition based on an interpolation of the object's position and destination. fReferenceClock can be a link to another clock or the object can actually have a clock of its own. This clock is run by addressing a set of clock parameters including: clock start, stop, rewind, and set. A behavior list is a list of current behaviors. If there is a move in process, MoveO is added to the behavior list so that PrepareMeO can make the appropriate method calls. Interpolation sets the interpolant to use for a given property calculation. In the base class, the only property that can be interpolated is the position.

TCharacter

```
class TCharacter:TAnimObject, MGraphic {
    TSound          fCurrentSound;
    TImage          fCurrentImage;
    Interpolant     fRotateInterpolant;
    Interpolant     fScaleInterpolant;
    TCharacterO;
    ~TCharacterO;
    RotateO;
    ScaleO; }
```

The TCharacter class is one possible base class for a character object. It is derived from the TAnimObject so it already has basic time references and positional information. TCharacter adds a physical description by also referencing the MGraphic base class, MGraphic includes information about the object's geometry, its properties and its transforms. Two possible additional behaviors might be to add scaling and rotating capabilities to the object. It is apparent that other behaviors may be added, such as controlling the object's sound or other attributes like walking, running, etc.

An Example of Animated Objects

In order to demonstrate the interplay of behaviors and states for an object, the following example is provided. Three animation objects are used in the example. The first object is a dog; the second object is a fire hydrant; the third object is a camera. The camera object is used to effect the views of the dog and the hydrant.

The dog is a 2½ D object (2 D description with a limited z-axis location). Its visual representation is described through sequences of pixmaps. Its state includes not only the current time and position, but also the current pixmap to be displayed. The dog's behaviors are relatively trivial; the dog can walk, sit, and bark. When the dog is walking, its PrepareMeO method communicates with its WalkO method which selects the next pixmap in the walk cycle.

The hydrant is a 3 D object. Its state includes a 3 D geometry, a scale and a color. At this point, the hydrant does not modify its position or geometry, so PrepareMeO does nothing. However, the hydrant is capable of modifying its appearance. The hydrant has two different methods for rendering, one for smooth shading and one for flat shading. By default, PresentMeO executes the smooth shading method. The object may, however be requested to render itself in flat shading. In this case, the PresentMeO method will execute the flat shading method and return its results.

The camera is a basic 2 D camera that can control panning (an effect similar to scrolling) over the field of the animation. Its state includes information including the field of view. It has a behavior that controls its motion called MoveMeO that gets initiated by the PrepareMeO method. Its PresentMeO method passes information back to the compositor that will effect the clipping of the final image. The camera's position and direction will also affect 3 D objects in the field of view (if any).

Definition of Sample Animated Objects

The class structure for the above objects can be represented in C++ as follows:

```
Class TDog (TCharacter) {
    Boolean              flsWalking;
    TDogO;
    ~TDogO;
    WalkO;
    SitO;
    BarkO; }
Class THydrant (TCharacter) {
    THydrantO;
    ~THydrantO;
    TSmoothShadingO;
    TFlatShadingO; }
Class TCamera (TCharacter) {
    TCameraO;
    ~TCameraO;
    TMoveMeO;
    TComposite(); }
```

Object Communication

There are two kinds of interactions in which objects can participate: those with other objects, and those with the user. Objects can be designed to query and be queried. For example, an object might understand the message "WhereAreYou" and respond with its current location. In our example, an animator can add a WhereAreYou method to the hydrant object. The animator can then add a behavior to the dog object to query the hydrant for its location and walk toward it. If movement is now scripted into the hydrant's location, the dog will track its location.

User's interactions can be programmed into objects in two ways. First, because scripts can have "if" statements, conditions based on user events can be scripted. For example, a script could contain a statement like the following:

"if mousedown then walk the dog to (mouse_x, mouse_y) for 5 sec". This script statement would execute the dog's walk cycle while moving it to the position of the mousedown (mouse_x, mouse_y). Mousedown is the position at which a user had activated a function key on a mouse (signal generation device) connected to the computer system of the present invention. Mousedown is a commonly used and well known processing concept.

Objects can also be internally programmed to respond to user events. In this case, the dog object would actually have a behavior called MouseDown that would handle the dog's response to user mouse events. In the first example, the dog's response to mouse events could be configured separately from the dog's base class. In this case, the dog's behavior would not be inherent to all dog objects. In a second example, the dog's response to mouse events could be included within the dog's base class. In this case, all dogs would respond to mousedowns by walking toward the mousedown location; unless, the mousedown routine was overridden.

Cut and Paste/Clip Animation

There are three methods in the present invention for cutting and pasting animation sequences. The most simple method of cutting animation is to retrieve every rendered frame, much like video. The animation portion cut using this method is only editable at the bitmap level. All animation specific information is lost. This method, however is the least computationally expensive option and the option requiring the least amount of disk storage.

The second level of animation cut/paste is to separately cut keyframe and object information. The concept provides that all objects in an animation and their associated paths of motion can be cut. This scheme presumes that a destination component (object or application program in which the animation cutting is pasted) has the ability to reevaluate the paths of motion and generate the inbetween frames. This method is optimal in terms of limiting storage requirements and allowing some level of edit capability at the other end.

The third form of clip animation provides a means for cutting and pasting whole objects including their associated state, behavior, and agents. Once an object is identified by a user for cutting, information related to the object's state, behavior, and agents are transferred to a cut/paste buffer for later retrieval in a paste operation.

An Example of an Implementation of the Present Invention

As an example of an implementation of the present invention, the source code for a video game is provided herewith under Appendix A. The source code provided in Appendix A is written in the C++ programming language; however, it will be apparent that other programming languages may equivalently be used. The example of the present invention in Appendix A is implemented on an Apple Macintosh ™ computer system developed by the assignee of the present invention.

The video game implemented by the source code of Appendix A is actually two games, both based on the same structures. In the first game, a user controls a triangle with a mouse or trackball device. The user can drag the triangle around the display screen and can shoot arrows by pressing the mouse button. At the same time, the user is being attacked by small green circles that randomly shoot arrows at the triangle. When an arrow hits a circle object or the triangle object, the object explodes. A score keeper is also provided.

In the second game, a collection of simple animation objects are implemented. One type of these objects is bouncing balls that collide with each other. Another object is a bar that grows and shrinks when other objects pass over it. Another object is an eye that appears to look at the user's mouse or the last object that the user touched. Each of the objects of the collection can be dragged using the mouse or trackball.

The source code implementing these games is structured according to the teachings of the present invention. Of particular note is the classes TWorldPort, TWorldObj, and the descendants of TWorldObj. TWorldPort operates as the Interaction Manager. TWorldPort is used for the following purposes:

it keeps track of what World objects currently exist
it tells the World object to calculate its next frame of animation
it calls the World objects to display itself
it handles offscreen compositing (buffering)
it sends events to and between the World objects
it asks World objects to check for collisions
it tells World objects when to die These functions are called in TWorldPort::Main. The Worldport keeps a list of World objects, and lists of rectangles associated with each World object for purposes of compositing (combining) their images in an offscreen buffer. The Worldport also maintains a list of messages pending, and offers the messages to the World objects until it finds one that is interested in the message.

TWorldObj is an animation object. The various World objects like ball, box, eyes, poly, and bullet, all descend from this object. The World object is used to perform the following functions:

calculate its next frame of animation: Animate()
draw itself: Draw()
check for collisions: CollisionCheck()
return the rectangle within which it will draw: GetUpdateRect()
handle mouse events on itself: HandleMouseDown()
handle World messages from other objects: HandleEvent()
set its position in space: SetPosition();

World objects can create other World objects. For example, TBall:Animate( ) will create new bullet objects as it randomly shoots arrows (bullets). World objects can directly call methods (i.e. procedures) in other World objects. For example, the bullet can call a routine that terminates another object (i.e. an object's death routine) when it detects that it has intersected the other object (see TBullet::CollisionCheck( ) ). World objects can post messages to a message queue, and other World objects can look for those messages. For example, when balls die, they post the "ballDied" message, and the score keeper object looks for these messages. This use of messaging by World objects and collision checking is an example of the present invention concept of an affect agent and affect volumes. Each World object can create its own animation and behavior in its own way, completely independent from any of the other World objects. This is an important advantage of the architecture of the present invention. Yet, even though the objects are independent, all these diverse World objects can, nevertheless coexist and interact in the same space.

Thus, a means and a method for the efficient generation and manipulation of animated objects in a computer-controlled environment is disclosed.

Although this invention has been shown in relation to a particular embodiment it should not be considered so limited. Rather, it is limited only by the appended claims.

APPENDIX A

```
// File Object_Animation.h
//
// Copyright © 1990 Apple Computer, Inc. All rights reserved.
// V1.0 30-May-90                                                        //
//
//===========================================================//
//                              //
//                              //     TMyApp
//                              //
//                              //
//
//===========================================================// class TMyWindow;
class TMyView;

class TMyApp : public TGraphicApplication {

ResponderDeclarationsMacro()

public:
```

```
        TMyApp(char *appName, MResponder *nextResponder = NIL,
            ApplicationState appState = kRunningState);
        virtual ~TMyApp();
        virtual void Main (TMemory& startInfo);

private:
        virtual void    CreateMyWindow ();
        TMyWindow*              fMyWindow;              // pointer to the
                                                        //Object_Animation window
        TSegment*               fPrefSegment;           // file seg to remember window
                                                        //location
        TGPoint                 windowLocation;         // window location
        TGPoint                 windowSize;             // window size
};
```

//================================================================//
//                                                                //
//                              //
//                                      TMyWindow
//                              //
//                              //
//                              //
//================================================================//

```
const int kWindowLeft = 100;                                    // default beginning sizes
const int kWindowTop = 50;
const int kWindowRight = 380;
const int kWindowBottom = 300;
const int kWindowWidth = kWindowRight - kWindowLeft;
const int kWindowHeight = kWindowBottom - kWindowTop;

class TMyWindow : public TStdWindow {
    ResponderDeclarationsMacro()
    public:
        TMyWindow(const TGPoint &itsSize, const TGPoint &itsLocation,
            const TText &title, TSegment* preferences,
            Boolean useStdTitleBar = TRUE, Boolean useStdGrowBar = TRUE,
            Boolean placeInSeparateLayer = TRUE, Boolean visible = TRUE);
        virtual         ~TMyWindow ();
        virtual void    Close();
        virtual void    SetLocation(const TGPoint &pt);
        virtual void    SetSize (const TGPoint& newSize);

private:
        TMyView*                fMyView;                // pointer to the
                                                        // object animation view
        TSegment*               fPreferences;           // preferences file
};
```

//================================================================//
//
//                              //

```
//
//                                                            TMyView
//                                                //
//                                                            //
//
//==================================================================// class TWorldPort;

class TMyView : public TContainerView {
        ResponderDeclarationsMacro()
        public:
                TMyView (const TGPoint& itsSize, const TGPoint& itsLocation,
                        Boolean visible = TRUE, Boolean drawClipped = TRUE);
                virtual         ~TMyView ();
                void            RequestResize ();
                Boolean                 HandleMouseDown( TStimulus* stim);
                Boolean                 HandleMouseUp( TStimulus* stim);

private:
                TViewPort*      fViewPort;          // the view port for the view
                TWorldPort*     fWorldPort;         // the world port for animating
        };
//
//==================================================================//
//
//                                                //
//                                                            TWorldMsg
//                                                //
//
//                                                            //
//
//==================================================================// class TWorldObj;                    // forward declaration class TWorldMsg : public MCollectible {
        public:
                                        TWorldMsg (const TToken& tok);
                virtual         ~TWorldMsg();
                virtual void    SetString(const TToken& tok);
                virtual void    SetPoint(const TGPoint pt);
                virtual TGPoint GetPoint() const;
                virtual void    GetString(TToken & tok) const;
                TWorldObj       *fObject;
        private:
                TGPoint         fValue;
                TToken          fString;
        };

//
//==================================================================//
//
//                                                //
//                                                            TWorldPort
//                                                //
```

```
//
//                                          //
//
//===============================================================// class TWorldPort : public MTask { protected:
            virtual void    Main (TMemory&);

public:
            TWorldPort (TMyView* view);
            virtual         ~TWorldPort ();
            void            RequestResize ();      // ask drawing task to resize
            void            AddObject(TWorldObj* thisObj, Boolean
                                            islast=TRUE);
                                                    // add world object
            void            PostEvent(TWorldMsg *message);
            TDeque*         GetObjList();
            void            PlaySound (short index);
            TGPoint         fMousePosition;
                            // so objects easily know where mouse is private:
            void            Animate ();            // basic animation step
            void            CollisionCheck();
            void            Draw();
            void            SetUpBuffer();
            void            DeleteBuffer();
            void            TrackMouse();
            void            DistributeEvents();
            void            DeathCheck();
            void            MakeNewBalls();
            void            RemoveAll ();  // remove & destroy all objects
            void            Refresh();

TMyView*        fView;                 // the view
            TViewPort*      fRealPort;
            Boolean         fRequestStop;  // ask animation loop to stop
            Boolean         fStopped;      // animation loop acknowledges
                                            // stopped
            Boolean         resizeRequested;       // signal drawing to
                                            // resize
            TGPoint         mySize;        // size of content frame
            TGrafPort       *fOffPort;     // offscreen view port for
                                            // outlines
            TImage          *fOffBuff;     // offscreen drawing buffer for
                                            // outlines
            TFrameBundle    *whiteFill;    // white color
            TDeque          fObjList;      // list of world objects
            TQueue          fMsgList;      // list of event messages
            TLocalSemaphore fMsgListSemaphore; // controls access to fMsgList
            TMouse          fMouse;        // used for position
            TDeque          fOldRectList;  // where objects were in last
                                            // frame
            TDeque          fRectList;     // where objects are now
```

```
        TDeque              fUpdateList;   // list of rectangles to update on
                                           // screen
        TGrafPort           *fBackPort;    // background view port
        TImage              *fBackBuff;    // background buffer
        TNekoSfx*           fSfx;          // sound effects
        TLocalSemaphore     fSfxDeath;     // used to kill sounds cleanly
};
```

//===============================================================//
//                                                               //
//                                                               //
//                              TWorldObj                        //
//                         //                                    //
//                                                               //
//                                                               //
//===============================================================//

```
class TWorldObj : public MCollectible
{
public:
        TWorldObj(TWorldPort* itsWorldPort, TMyView* itsView);
        virtual ~TWorldObj();
        virtual void Animate();
        virtual TGPoint GetPosition();
        virtual TGPoint GetFocus();              // focus is an interesting point on object
        virtual void SetPosition(const TGPoint& newPosition);
        virtual TGRect Bounds() = 0;
        virtual void TrackMouse();
        virtual void ConnectTo(TWorldObj* thisObj);
        virtual void Draw(TGrafPort* myGrafPort) = 0;
        virtual Boolean HandleEvent(TWorldMsg *theEvent);
        virtual Boolean HandleMouseDown(TWorldMsg *theEvent);
        virtual Boolean HandleMouseUp(TWorldMsg *theEvent);
        virtual TGPoint GetOldVelocity();
        virtual void CollisionCheck();
        virtual Boolean Collider();
        virtual void Death();
        virtual short ClassName() = 0;
        virtual TGRect GetUpdateRect();
        virtual Boolean IsAlive();
        virtual void SetColor(GIntensity r, GIntensity g, GIntensity b);

protected:

TGPoint         fPosition;       // Objects position
        TGPoint         fMouseOffset;    // "point clicked on
                                         // object"

TWorldPort*     fWorldPort;      // our parent worldport
        TMyView*        fView;           // our view Boolean         fMouseDrag;      // we are being dragged
        TWorldObj       *fConnectObj;    // object we are
```

```
    Boolean         fAlive;         // connected to
    TGRect          fOldBounds;     // where we used to be

};
```

//================================================================//
//                                                                //
//                          TWorldCursor                          //
//                                                                //
//                                                                //
//================================================================//

```
class TWorldCursor : public TWorldObj
    {
public:
    TWorldCursor(TWorldPort* itsWorldPort, TMyView* itsView);
    virtual ~TWorldCursor();
    void Animate();
    TGRect Bounds();
    void Draw(TGrafPort* myGrafPort);
    virtual Boolean HandleEvent(TWorldMsg *theEvent);
    short ClassName();

};
```

//================================================================//
//                                                                //
//                             TBall                              //
//                                                                //
//                                                                //
//================================================================//

```
class TBall: public TWorldObj
    {
public:
    TBall(TWorldPort* itsWorldPort, TMyView* itsView, const TGPoint& avoidPt);
    virtual ~TBall();
    void Animate();
    TGRect Bounds();
    void Draw(TGrafPort* myGrafPort);
    void SetColor(GIntensity r, GIntensity g, GIntensity b);
    //virtual void CollisionCheck();
    Boolean Collider();
    TGPoint GetOldVelocity();
    short ClassName();
```

```
        Boolean IsAlive();
        void Death();

private:
        TGPoint                 fVelocity;
        TGPoint                 fOldVelocity;
        TGPoint                 fSize;
        GIntensity              red,green,blue;
        TGOval                  fOval;
        short                   fCounter;
        short                   fAbsVelocity;
        };
```

//===============================================================//
//                                                               //
//                                                               //
//                              TBox                             //
//                         //                                    //
//                                                               //
//                         //                                    //
//                                                               //
//===============================================================//

```
class TBox: public TWorldObj
        {
public:
        TBox(TWorldPort* itsWorldPort, TMyView* itsView);
        virtual ~TBox();
        void Animate();
        TGRect Bounds();
        void Draw(TGrafPort* myGrafPort);
        virtual TGPoint GetFocus();        // focus is an interesting point on object
        void CollisionCheck();
        short ClassName();

private:

short           fHeight;           // height of box
        short           fdH;               // delta height
        Boolean         fPaused;           // true when in pause mode

};
```

//===============================================================//
//                                                               //
//                         //                                    //
//                              TEyes                            //
//                         //                                    //
//                                                               //
//                         //                                    //
//                                                               //
//===============================================================//

```
class TEyes: public TWorldObj
```

```
        {
public:
        TEyes(TWorldPort* itsWorldPort, TMyView* itsView);
        virtual ~TEyes();
        void Draw(TGrafPort* myGrafPort);
        TGRect Bounds();
        Boolean HandleEvent(TWorldMsg *theEvent);
        virtual TGPoint GetFocus();            // focus is an interesting point on object
        short ClassName();
protected:
        void Intersect(float x0, float y0);

private:

TGPoint              fStartPosition;    // Eye's starting position
        float                aa, bb;            // max eye range ellipse
        float                esd2;              // eye size divided by 2
        float                osx, osy;          // outline size x/y
        TGOval               *fEye1;            // the circle eye1 pupil
        float                penWidth;          // pen width
        TGrafPort            *fOvalPort;        // offscreen view port for
                                                // outlines
        TImage               *fOvalBuff;        // offscreen drawing
                                                // buffer for outlines
        };

//==============================================================//
//                                                              //
//                              //
//                              TPoly
//                      //
//                                                              //
//                              //
//==============================================================//
class TPoly: public TWorldObj
        {
public:
        TPoly(TWorldPort* itsWorldPort, TMyView* itsView);
        virtual ~TPoly();
        void Animate();
        void PerfectPoly();
        TGRect Bounds();
        void Draw(TGrafPort* myGrafPort);
        Boolean HandleEvent(TWorldMsg *theEvent);
        short ClassName();
        Boolean IsAlive();
        Boolean Collider();
        void Death();

private:
        float Abs(float g);
        Boolean HandleMouseDown(TWorldMsg *theEvent);
```

```
        TGPoint          fDragPt;        // point on poly being dragged
        float            fLength;        // length of the polygon
        float            fWidth;         // width of the polygon
        float            fSize;          // for dying animation
        TGPolygon*       fPolygon;       // our favorite polygon
        TGLine*          fLine;
        TGRect*          fDyingRect;
    };
```

//
//==================================================================//
//
//                                    //
//                                          TBullet
//                                    //
//
//                                    //
//
//==================================================================//

```
class TBullet: public TWorldObj
    {
public:
        TBullet(TWorldPort* itsWorldPort, TMyView* itsView,
                    const TGPoint& start, const TGPoint& velocity, short prey);
        virtual ~TBullet();
        void Animate();
        TGRect Bounds();
        void Draw(TGrafPort* myGrafPort);
        void SetColor(GIntensity r, GIntensity g, GIntensity b);
        virtual void CollisionCheck();
        Boolean Collider();
        Boolean HandleEvent(TWorldMsg *theEvent);
        short ClassName();
        Boolean IsAlive();

private:
        TGPoint             fVelocity;
        TFrameBundle        fColor;
        TGLine*             fLine;
        Boolean             fArmed;
        short               fCounter;
        Boolean             fIsDead;
        short               fPrey;
    };
```

//
//==================================================================//
//
//                                    //
//                                          TScore
//                                    //
//
//                                    //

```cpp
//
//===============================================================// class TScore: public TWorldObj
    {
public:
        TScore(TWorldPort* itsWorldPort, TMyView* itsView);
        virtual ~TScore();
        TGRect Bounds();
        void Draw(TGrafPort* myGrafPort);
        Boolean HandleEvent(TWorldMsg *theEvent);
        short ClassName();

private:
        short           fdH;
        short           fScore;
    };
//===============================================================//
//
//                                                              //
// File Object_Animation.c                                      //
// Copyright © 1990 Apple Computer, Inc. All rights reserved.   //
// V1.0 30-May-90
//                    //
//
//                                                              //
//===============================================================// include <GraphicImage.h>
include <ApplicationFramework.h>
#include <Exceptions.h>
#include <Events.h>
#include <Kernel.h>
#include <Math.h>
#include "Sfx.h"
#include "Object_Animation.h"

//
//===============================================================//
//
//                           //
//      main
//                      //
//          Create the Object_Animation application object and set it running.
//          //
//
//                        //
//
//===============================================================// main() {
        qprintf("Object_Animation 1.0 (d11) begin...\n");
        TMyApp *fMyApp = new TMyApp("Object_Animation", NIL, kRunningState);
                                // Create app object
        fMyApp->Start();        // TGraphicApplication is MMessageTask so use Start()
```

```
        delete fMyApp;                      // If we get here then the user has quit the app.
        qprintf("Object_Animation end\n");
        return 0;                           // for C runtime clean-up
}
```

//
//==============================================================//
//                                                              //
//                                                              //
//                                  //
//                                        TMyApp
//                                  //
//                                                              //
//                                  //
//                                                              //
//==============================================================//

ResponderDefinitionsMacro( TMyApp, TGraphicApplication::ExecuteMyResponse( stimulus ) )

TMyApp::TMyApp (char *appName, MResponder *nextResponder, ApplicationState appState)
            : TGraphicApplication(appName, nextResponder, appState) {
    qprintf("TMyApp constructor\n");

ResponderConstructorBeginMacro()
        // no responders
    ResponderConstructorEndMacro()

MResponder::SetPrintFlag(FALSE);   // Set TRUE to watch msgs in responder chain
} void TMyApp::Main (TMemory& startInfo) {
    qprintf("TMyApp::Main\n");
    CreateMyWindow ();
    TGraphicApplication::Main(startInfo);
} void TMyApp::CreateMyWindow () {
    qprintf("TMyApp::CreateMyWindow\n");

TRY {                               // read existing preferences file
        fPrefSegment = new TFileSegment("Object_Animation preferences");
        windowLocation <<= *fPrefSegment;
        windowSize <<= *fPrefSegment;
        qprintf("Window loc (old) = %f %f\n", windowLocation.fX,
                                              windowLocation.fY);
        qprintf("Window size (old) = %f %f\n", windowSize.fX, windowSize.fY);
    }
    EXCEPT {                            // if needed, create new preferences file
        fPrefSegment = new TFileSegment("Object_Animation preferences",
                                        kDoCreate);
        windowLocation.fX = kWindowLeft;
        windowLocation.fY = kWindowTop;
        windowSize.fX = kWindowWidth;
        windowSize.fY = kWindowHeight;

```
        windowLocation >>= *fPrefSegment;
        windowSize >>= *fPrefSegment;
        qprintf("Window loc (new) = %f  %f\n", windowLocation.fX,
                                               windowLocation.fY);
        qprintf("Window size (new) = %f  %f\n", windowSize.fX, windowSize.fY);
        }
    ENDTRY fMyWindow = new TMyWindow(windowSize, windowLocation,
            TText("Object_Animation"), fPrefSegment);     // create window

}

TMyApp::~TMyApp () {
    qprintf("TMyApp destructor start\n");
    delete fMyWindow;
    delete fPrefSegment;
    qprintf("TMyApp destructor end\n");
    }

//
//=================================================================//
//                                       //
//                                       //           TMyWindow
//                               //
//                                       //
//                                       //
//
//=================================================================//

ResponderDefinitionsMacro( TMyWindow, TStdWindow::ExecuteMyResponse( stimulus )
)

TMyWindow::TMyWindow (const TGPoint& itsSize, const TGPoint& itsLocation,
            const TText& title, TSegment* preferences,
            Boolean useStdTitleBar, Boolean useStdGrowBar,
            Boolean placeInSeparateLayer, Boolean visible)
            : TStdWindow (itsSize, itsLocation, title, useStdTitleBar,
useStdGrowBar,
                                                  placeInSeparateLayer, visible) {
    qprintf("TMyWindow constructor\n");

ResponderConstructorBeginMacro()
        // no responders
    ResponderConstructorEndMacro()

fMyView = new TMyView(GetContentFrameSize(), TGPoint(0,0)); // create view
    SetContentView(fMyView);                        // set window content view
    fPreferences = preferences;
    } void TMyWindow::SetLocation(const TGPoint &pt) {     // if window moves...
```

```
        qprintf("TMyWindow::SetLocation\n");
        TStdWindow::SetLocation(pt);          // call SetLocation in superclass
        fPreferences->Reset();                // write out new window size/location
        GetLocation() >>= *fPreferences;
        GetSize() >>= *fPreferences;
        } void TMyWindow::SetSize (const TGPoint& newSize) {   // if window resized...
        qprintf("TMyWindow::SetSize\n");
        TStdWindow::SetSize(newSize);         // call SetSize in window superclass
        fMyView->SetSize(GetContentFrameSize()); // set new view size
        fMyView->RequestResize();             // request drawing size change
        fPreferences->Reset();                // write out new window size/location
        GetLocation() >>= *fPreferences;
        GetSize() >>= *fPreferences;
        } void TMyWindow::Close() {
        qprintf("TMyWindow::Close\n");        // if close box, do same as app quit
        TGraphicApplication::GetRunningApplication()->HandleQuit(NIL);
        }

TMyWindow::~TMyWindow () {
        qprintf("TMyWindow destructor\n");
        delete fMyView;
        }

//
//==============================================================//
//
//                                      //
//                                      //    TMyView
//                                      //
//                                      //
//                                      //
//
//==============================================================//

ResponderDefinitionsMacro( TMyView, TContainerView::ExecuteMyResponse( stimulus )
)

TMyView::TMyView (const TGPoint& itsSize, const TGPoint& itsLocation,
                              Boolean visible, Boolean drawClipped)
               : TContainerView (itsSize, itsLocation, visible, drawClipped) {

ResponderConstructorBeginMacro()
            RegisterResponseMacro( TMyView, "MouseDown", HandleMouseDown )
            RegisterResponseMacro( TMyView, "MouseUp", HandleMouseUp )
        ResponderConstructorEndMacro()

fWorldPort = new TWorldPort (this);   // initialize the WorldPort task
```

```
          // get the objects
#if 0
          // cursor
     fWorldPort->AddObject( new TWorldCursor(fWorldPort, this) );
#endif
#if 0
          // polygon
     fWorldPort->AddObject( new TPoly(fWorldPort, this) );
#endif
#if 0
          // ball
     TWorldObj *ballObj = new TBall(fWorldPort, this, 40, 80);
     fWorldPort->AddObject( ballObj );
     ((TBall*)ballObj)->SetColor(0x1000, 0x1000, 0xffff); // blue ball
          // ball2
     fWorldPort->AddObject( new TBall(fWorldPort, this, 100, 140) ); // green ball
          // ball3
     ballObj = new TBall(fWorldPort, this, 80, 280);
     fWorldPort->AddObject( ballObj );
     ((TBall*)ballObj)->SetColor(0xffff, 0x1000, 0x1000); // red ball
          // box
     fWorldPort->AddObject( new TBox(fWorldPort, this) );
#endif
#if 0
          // first eye
     TWorldObj *eyeObj = new TEyes(fWorldPort, this);
     fWorldPort->AddObject( eyeObj );
     eyeObj->ConnectTo(ballObj);
          // second eye
     TWorldObj *eyeObj2 = new TEyes(fWorldPort, this);
     fWorldPort->AddObject( eyeObj2 );
     eyeObj2->ConnectTo(ballObj);
     TGPoint eyePoint = eyeObj2->GetPosition();
     eyePoint.fX += 120;
     eyeObj2->SetPosition(eyePoint); // move the second eye to the right
#endif

}

Boolean TMyView::HandleMouseDown( TStimulus* stim)
{
     TMouseEvent*    mouse = (TMouseEvent*) stim;
     TGPoint mousePosition = mouse->GetGlobalLocation();
     this->GlobalToSelf( mousePosition );

// generate our own internal event
     TWorldMsg *message= new TWorldMsg(TToken("mouseDown"));
     message->SetPoint(mousePosition);
     fWorldPort->PostEvent(message);

return TRUE; // we handled the event
}
Boolean TMyView::HandleMouseUp( TStimulus* stim)
{
     TMouseEvent*    mouse = (TMouseEvent*) stim;
```

```
        TGPoint mousePosition = mouse->GetGlobalLocation();
        this->GlobalToSelf( mousePosition );

// generate our own internal event
        TWorldMsg *message= new TWorldMsg(TToken("mouseUp"));
        message->SetPoint(mousePosition);
        fWorldPort->PostEvent(message);

return TRUE;   // we handled the event
} void TMyView::RequestResize () {
        fWorldPort->RequestResize();            // pass resize request to task
        }

TMyView::~TMyView () {
        delete fWorldPort;
        }

//
//================================================================//
//
//                                          //
//                                                  TWorldMsg
//                                  //
//
//                                          //
//
//================================================================//

TWorldMsg::TWorldMsg (const TToken& tok) {
        fString = tok;
        fValue.fX = 0;
        fValue.fY = 0;
        fObject = NIL;
        }

TWorldMsg::~TWorldMsg() {
        } void TWorldMsg::SetString(const TToken& tok)
        { fString = tok; } void TWorldMsg::SetPoint(const TGPoint pt)
        { fValue = pt; }

TGPoint TWorldMsg::GetPoint() const
        { return fValue; } void TWorldMsg::GetString(TToken & tok) const
        { tok = fString; }
//
//================================================================//
//
                                    //
```

```
//                                    TWorldPort
//                                //
//                            //
//
//================================================================//

TWorldPort::TWorldPort (TMyView* view) : MTask(kAnimationTask), fMouse("Mickey")
{
        fSfx = NIL;
        fRealPort = new TViewPort(view);    // get drawing port
        fRealPort->SetTask(this);           // tell port this task for synchronization
        fRequestStop = FALSE;               // initialize task control variables
        fStopped = FALSE;
        resizeRequested = FALSE;
        fView = view;
        SetUpBuffer();

this->Start ();                     // start the task
} void TWorldPort::AddObject(TWorldObj* thisObj, Boolean islast)
        {
        if (islast)
                { fObjList.AddLast(thisObj); }
        else
                { fObjList.AddFirst(thisObj); }
        } void TWorldPort::Refresh() {
        mySize = fView->GetSize();
        TGRect arect(0,0,mySize.fX,mySize.fY);
        fRealPort->CopyImage(fBackPort, arect, arect);
        } void TWorldPort::SetUpBuffer() {
        mySize = fView->GetSize();                  // set up off screen buffers
        fOffBuff = new TImage(TGPoint(0,0), (short) mySize.fX, (short) mySize.fY,
                        k256Colors);
        fOffPort = new TGrafPort(fOffBuff->GetGrafDevice());
        fBackBuff = new TImage(TGPoint(0,0), (short) mySize.fX, (short) mySize.fY,
                        k256Colors);
        fBackPort = new TGrafPort(fBackBuff->GetGrafDevice());

// all the rest is just painting into the background
        // clear buffer to backcolor
        TFillBundle backcolor(65535, 56407, 59608);
        TGRect arect(0,0,mySize.fX,mySize.fY);
        fBackPort->Fill(arect, &backcolor);
        // draw some text into the background
        short titleHeight = 40;
        short titleWidth = 160;  // this is an estimate
        TGPoint titleBegin((mySize.fX-titleWidth)/2, mySize.fY/2.0 + titleHeight/4 + 3);
        TFont helvetica("Helvetica", titleHeight);

TGString titleString(titleBegin + TGPoint(0, -8), (PartialChar*)
                        "Object_Animation");
```

```
TFillBundle titleFiller(0.501 /*0x8000*/, 0.501 /*0x8000*/, 0.751 /*0xc000*/);
fBackPort->SetFillPaint(&titleFiller);
fBackPort->Draw(titleString, &helvetica);

TGString nameString(TGPoint(titleBegin.fX+3, titleBegin.fY + 12), (PartialChar*)
        "by Apple");
TFont nameFont("Helvetica", 15);
TFillBundle nameFiller(0.439 /*0x7000*/, 0.439 /*0x7000*/, 0.439 /*0x7000*/);
fBackPort->SetFillPaint(&nameFiller);
fBackPort->Draw(nameString, &nameFont);

} void TWorldPort::DeleteBuffer() {
    delete fOffBuff;
    delete fOffPort;
    delete fBackBuff;
    delete fBackPort;
} void TWorldPort::Main (TMemory &) {
    TMilliseconds DelayAmount(300);   // hack so window up before animation starts
    DelayAmount.Delay();

RelativePriority relpr = GetRelativePriority();        // bump my priority up 20
    qprintf("Relative Priority: %d \n",relpr);
    SetRelativePriority (relpr-20);
    relpr = GetRelativePriority();
    qprintf("New Relative Priority: %d \n",relpr);

fSfx = new TNekoSfx(&fSfxDeath);
    fSfx->Start();

DelayAmount = 5;
    Refresh();
    while (!fRequestStop) {                                 // until asked to stop...

TrackMouse();                                   // for mouseposition
            DistributeEvents();                             // send events to objects
            Animate ();                                     // calculate next position
            CollisionCheck();                               // check for collisions
            Draw();
    // actually draw next frame
            DeathCheck();                                   // kill off dead objects
            MakeNewBalls();                                 // if all balls killed, make
                                                            // new ones
            DelayAmount.Delay();                            // yield 1/10 sec
            //Yield_CPU();  // this doesn't work good, doesn't allow window to draw
            if (resizeRequested) {                          // on resize request...
                    DeleteBuffer();
                    SetUpBuffer();
                    resizeRequested = FALSE;
                    // need to redraw here?
                    Refresh();
            }
```

```
        }
        fSfx->Kill();
        // we send a sound message just so it wakes up to notice it is time to quit!
        // but maybe this is dangerous because we are starting a sound just as we are dying?
        PlaySound(TNekoSfx::kShot);
        fSfxDeath.Acquire();  // wait until the sound task is really done!
        delete fSfx;

fStopped = TRUE;                        // acknowledge stopped

} void TWorldPort::PostEvent(TWorldMsg *message) {
        fMsgListSemaphore.Acquire();
        fMsgList.Insert(message);
        fMsgListSemaphore.Release();
    } void TWorldPort::TrackMouse() {
        fMousePosition = fMouse.GetCursorLocation();
        fView->GlobalToSelf(fMousePosition);
    } void TWorldPort::DistributeEvents() {
        fMsgListSemaphore.Acquire();
        // for each event in the fMsgList queue, pass it to all objects until eaten
        TWorldMsg *message;
        for ( message = (TWorldMsg*) fMsgList.Pop();
                        message != NULL;
                        message = (TWorldMsg*) fMsgList.Pop() )
            {
            // note that because an object's HandleEvent might post an event, we
            // need to release the semaphore here, or it would get stuck in postevent
            // which tries to reacquire the semaphore
            fMsgListSemaphore.Release();
            Boolean ateIt;
            TWorldObj *object;
            for ( object = (TWorldObj*) fObjList.First();
                            object != NULL;
                            object = (TWorldObj*) fObjList.After(object) ) {
                ateIt = object->HandleEvent(message);
                if (ateIt) { break; }
                }
            delete message; // done with the message too.
            fMsgListSemaphore.Acquire();
            }
        fMsgListSemaphore.Release();
    } void TWorldPort::Animate () {
        TWorldObj *object;
        for ( object = (TWorldObj*) fObjList.First();
                        object != NULL;
                        object = (TWorldObj*) fObjList.After(object) ) {
            object->Animate();
```

```
            }
    } void TWorldPort::CollisionCheck () {
    TWorldObj *object;
    for ( object = (TWorldObj*) fObjList.First();
                    object != NULL;
                    object = (TWorldObj*) fObjList.After(object) ) {
        object->CollisionCheck();
    }
} void TWorldPort::DeathCheck () {
    TWorldObj *object;
    for ( object = (TWorldObj*) fObjList.First();
                    object != NULL;
                    object = (TWorldObj*) fObjList.After(object) ) {
        if (!object->IsAlive()) // is object still alive?  if not, kill it off
        {
            fObjList.Remove(object);
            delete object;
        }
    }
} void TWorldPort::Draw () {
if 0
// this is the simple composite, clearing & blitting entire window
    TFrameBundle whiteFill(65535, 65535, 65535);     // white background
    fOffPort->Fill(TGRect(0,0,mySize.fX,mySize.fY),&whiteFill);    // clear buffer
    TWorldObj *object;
    for ( object = (TWorldObj*) fObjList.Last();
                    object != NULL;
                    object = (TWorldObj*) fObjList.Before(object) ) {
        object->Draw(fOffPort);
    }
    fRealPort->CopyImage (fOffPort,TGRect(0,0,mySize.fX,mySize.fY),
                                                    // blit to screen
                    TGRect(0,0,mySize.fX,mySize.fY));
#endif
// here starts the fancy composite, working only with rectangles that have changed
    // step 1:  clear buffer for each object  (probably faster to blit instead of erase!)
    TWorldObj *object;
    for ( object = (TWorldObj*) fObjList.Last();
                    object != NULL;
                    object = (TWorldObj*) fObjList.Before(object) ) {
        TGRect arect = object->GetUpdateRect();
        fOffPort->CopyImage(fBackPort, arect, arect);
                                    // alternatively could clear to white here
    }
    // step 2:  draw each object
    for ( object = (TWorldObj*) fObjList.Last();
                    object != NULL;
                    object = (TWorldObj*) fObjList.Before(object) ) {
        object->Draw(fOffPort);
```

```cpp
        }
        // step 3: copy each object onto screen
        for ( object = (TWorldObj*) fObjList.Last();
                        object != NULL;
                        object = (TWorldObj*) fObjList.Before(object) ) {
                TGRect arect = object->GetUpdateRect();
                fRealPort->CopyImage(fOffPort, arect, arect);
                }

} void TWorldPort::MakeNewBalls () {
        TWorldObj *object;
        TWorldObj *polyObj = NULL;
        short    counter = 0;
        Boolean newScene = FALSE;
        for ( object = (TWorldObj*) fObjList.First();
                        object != NULL;
                        object = (TWorldObj*) fObjList.After(object) ) {
                if (object->ClassName() == 5) { // class TPoly
                        polyObj = object;
                        }
                if (object->ClassName() == 2) { // class TBall
                        counter += 1;
                        }
                }
        if (polyObj == NULL) { // if polygon died, then make a new scene
                RemoveAll(); // get rid of all objects (note: cursor leaves too!)
                counter = 0; // no more balls
                polyObj = new TPoly(this, fView);
                AddObject(polyObj);
                AddObject( new TWorldCursor(this, fView) );
                                        // add cursor for cleaning cursor mung (?)
                AddObject(new TScore(this, fView)); // add score counter,
                                        // but at bottom of list
                Refresh(); // clear the screen
                TMilliseconds DelayAmount(2000);
                DelayAmount.Delay();                    // give player a second to rest
                }
        if (polyObj != NULL) {
                if (counter == 0) {
                        for (int i = 1; i<=5; i++) {
                                TWorldObj *ball = new TBall(this,
                                                fView, polyObj->GetPosition());
                                AddObject(ball, FALSE); // add balls to front of display list
                                ball->ConnectTo(polyObj);
                                }
                        }
                }
} void TWorldPort::RequestResize () {              // resize request method
        resizeRequested = TRUE;
        }
```

```
void TWorldPort::RemoveAll () {
    TWorldObj *object;
    for ( object = (TWorldObj*) fObjList.RemoveFirst();
                    object != NULL;
                    object = (TWorldObj*) fObjList.RemoveFirst() ) {
        delete object;
    }
}

TWorldPort::~TWorldPort () {
    qprintf("TWorldPort destructor start\n");

fRequestStop = TRUE;                        // ask Main to stop
    TMilliseconds DelayAmount(100);
    while (!fStopped) {                         // check until Main says stopped
        DelayAmount.Delay();
    }

RemoveAll();
    delete fRealPort;
    delete fOffPort;
    delete fOffBuff;

qprintf("TWorldPort destructor end\n");
}

TDeque* TWorldPort::GetObjList()
{
    return &fObjList;
} void TWorldPort::PlaySound(short index)
{
    TKernelMessage    aMessage;

// qprintf ( "TWorldPort::PlaySound ( %d ) \n", index);
    if ( index < 0 || index >= kNumSounds )
    {
        qprintf("sound %d out of range\n", index);
    } index >>= aMessage;

TRY
        aMessage.Send (*fSfx);
    EXCEPT
        // fSfx is gone
    ENDTRY
}

//
//================================================================//
//
//                                                //
//                                                TWorldObj
```

```
//                                           //
//
//                                     //
//
//=================================================================//

TWorldObj::TWorldObj(TWorldPort* itsWorldPort, TMyView* itsView)
    {
    fWorldPort = itsWorldPort;
    fView = itsView;
    fMouseDrag = FALSE;
    fConnectObj = NIL;
    fAlive = TRUE;
    fOldBounds.SetToEmpty();
    }

TWorldObj::~TWorldObj()
    {
    } void TWorldObj::Animate()
    {
    fOldBounds = Bounds();  // remember where we were before making changes
    TrackMouse();
    }

Boolean TWorldObj::IsAlive()
    {
    return fAlive;
    }

TGRect TWorldObj::GetUpdateRect()
    {
    TGRect urect;
    if (fOldBounds.IsEmpty())
            { urect = Bounds(); }
    else
            {
            urect = fOldBounds;
            urect.Union(Bounds());  // does this really work?
            }
    // bug: need to extend bounds
    urect.Inset(-1,-1);
    return urect;
    } void TWorldObj::CollisionCheck()  // default object doesn't do collisions
    {
    }

Boolean TWorldObj::Collider()  // returns true if object is collidable
    {
    return FALSE;
    }

Boolean TWorldObj::HandleEvent(TWorldMsg *theEvent)
```

```
{
    Boolean answer = FALSE;
    TToken tok;
    static TToken kmousetok("mouseDown");
    theEvent->GetString(tok);
    // there must be a more elegant C way of doing the following:
    if (tok == kmousetok)
            { answer = HandleMouseDown(theEvent); }
    else if (tok == TToken("mouseUp"))
            { answer = HandleMouseUp(theEvent); }
    return answer;

}

Boolean TWorldObj::HandleMouseDown(TWorldMsg *theEvent)
{
    if (Bounds().Contains(theEvent->GetPoint())) {
                fMouseOffset = fPosition - theEvent->GetPoint();
                fMouseDrag = TRUE;

// post a "start dragging" event here... include object reference
                TWorldMsg *message= new TWorldMsg(TToken("startDrag"));
                message->fObject = this;  // reference to object being dragged
                fWorldPort->PostEvent(message);

return TRUE; // we eat the event
        }
    else { return FALSE; }
}

Boolean TWorldObj::HandleMouseUp(TWorldMsg *theEvent)
{
    // following assumes only one object being dragged at a time...
    if (fMouseDrag) { // if we were dragging before then eat this event
          fMouseDrag = FALSE;
          return TRUE;
          }
    else
          { return FALSE; } // if we weren't dragging, its not our event!
} void TWorldObj::TrackMouse()
{
    if (fMouseDrag) {
                fPosition = fWorldPort->fMousePosition + fMouseOffset;
        }
}

TGPoint TWorldObj::GetPosition()
{
    return fPosition;
}

TGPoint TWorldObj::GetFocus()
{
    return fPosition;
}
```

```cpp
void TWorldObj::SetPosition(const TGPoint& newPosition)
    {
    fPosition = newPosition;
    } void TWorldObj::ConnectTo(TWorldObj* thisObj)
    {
    fConnectObj = thisObj;
    }

TGPoint TWorldObj::GetOldVelocity()
    {
    TGPoint aPoint(0, 0);
    return aPoint;
    } void TWorldObj::Death()
    {
    fAlive = FALSE;
    } void TWorldObj::SetColor(GIntensity r, GIntensity g, GIntensity b)
    {
    // default objects don't set their color.
    }

//================================================================//
//                                                                //
//                              Utilities                         //
//                                                                //
//                                                                //
//================================================================// float Abs(float g)
    {
    if (g > 0)
            {return g;}
    else
            {return -g;}
    }

TGPoint Pythagoras(float XX,float YY, float len)
    {
    float y, x, slope;
    if (Abs(YY) < 1E-4)
            { y = 0; x = len; }
    else {
            slope = XX/YY;
            slope = 1+(slope*slope);
            y = sqrt((len*len)/slope);  // from pythagoras
            if (YY<0)
                    {y = -y;}
            x = y*XX/YY;
```

```
        }
        TGPoint pt(x,y);
        return pt;
        }
```

//==============================================================//
//                                                              //
//                          TWorldCursor                        //
//                                                              //
//                                                              //
//==============================================================//

```
TWorldCursor::TWorldCursor(TWorldPort* itsWorldPort, TMyView* itsView) :
        TWorldObj(itsWorldPort, itsView)
        {
        }

TWorldCursor::~TWorldCursor()
        {
        }

Boolean TWorldCursor::HandleEvent(TWorldMsg *theEvent)
        {
        return FALSE;  // cursor should never eat an event
        } void TWorldCursor::Animate()
        {
        fOldBounds = Bounds();  // remember where we were before making changes
        fPosition = fWorldPort->fMousePosition;
        } void TWorldCursor::Draw(TGrafPort* myGrafPort)
        {
        // we shall have an invisible cursor for now, just to update the mung on screen
#if 0
        TGRect arect(Bounds());
        // vertical
        TGLine aline(fPosition.fX, arect.fTop, fPosition.fX, arect.fBottom);
        TFrameBundle aColor(0xffff, 0x1000, 0x1000);
        myGrafPort->Frame(aline, &aColor);
        // horizontal
        TGLine aline2(arect.fLeft, fPosition.fY, arect.fRight, fPosition.fY);
        myGrafPort->Frame(aline2, &aColor);
#endif
        }

TGRect TWorldCursor::Bounds()
        {
        TGRect arect(fPosition, fPosition);
        arect.Inset(-8, -8);
        return arect;
```

```
       }
short TWorldCursor::ClassName()
       {
       return 1;
       }

//================================================================//
//                                                                //
//                              TBall                             //
//                                                                //
//                                                                //
//================================================================//

TBall::TBall(TWorldPort* itsWorldPort, TMyView* itsView, const TGPoint& avoidPt) :
       TWorldObj(itsWorldPort, itsView)
       {
       TGPoint size = fView->GetSize();
       TRandomNumberGenerator rand;
       red = 0x1000;
       green = 0xffff;
       blue = 0x1000;
       fSize.fX = 5;
       fSize.fY = 5;
       fCounter = (short) rand.Next() % 4;
       TGRect avoidRect(avoidPt, avoidPt);
       avoidRect.Inset(-80, -80);
       // get a random position within the view
       do
              {
              fPosition.fX = fSize.fX + (rand.Next() % (short) size.fX-(2*fSize.fX));
              fPosition.fY = fSize.fY + (rand.Next() % (short) size.fY-(2*fSize.fY));
              }
       while (avoidRect.Contains(fPosition));
#if 0
       fVelocity.fX = (rand.Next() % 10) - 5;
       fVelocity.fY = (rand.Next() % 10) - 5;
       fOldVelocity = fVelocity; // shouldn't need this
#endif
       fVelocity.fX = 0;
       fVelocity.fY = 0;
       fAbsVelocity = 4;
       fOval.fBounds.Set(fPosition-fSize, fPosition+fSize);
       }

TBall::~TBall()
       {
       } short TBall::ClassName()
       {
```

```
        return 2;
    } void TBall::Animate()
    {
    TRandomNumberGenerator rand;
    fOldBounds = Bounds(); // remember where we were before making changes
    TrackMouse();

if (fAlive)
        {
        fCounter += 1;
        if (fCounter >= 8) { // time to chase after the polygon
            fCounter = 0;
            #if 1
            TGPoint between = fConnectObj->GetPosition() - fPosition;
            fVelocity = Pythagoras(between.fX, between.fY, fAbsVelocity);
            fVelocity.fX += (rand.Next() % 4) -2;
            fVelocity.fY += (rand.Next() % 4) -2;
            #else
            fVelocity.fX = (rand.Next() % fAbsVelocity) - (fAbsVelocity/2);
            fVelocity.fY = (rand.Next() % fAbsVelocity) - (fAbsVelocity/2);
            #endif
            } fPosition += fVelocity;
        fOval.fBounds.Set(fPosition-fSize, fPosition+fSize);

// lets shoot a bullet at the polygon!
        if ((rand.Next() % 30) == 1) {
            TGPoint itsPosition = fConnectObj->GetPosition();
            TGPoint velocity = Pythagoras(itsPosition.fX-fPosition.fX,
                                          itsPosition.fY-fPosition.fY, 20);
            TWorldObj* bullet = new TBullet(fWorldPort, fView, fPosition,
                                             velocity, 5); // 5 = poly
            bullet->SetColor(1.0, 0, 0);
            fWorldPort->AddObject(bullet, FALSE/*last*/);
                                          // add bullet to front of list
            } if 0
        // get the viewRect
        TGRect viewRect;
        TGPoint size = fView->GetSize();
        viewRect.Set(fSize.fX, fSize.fY, size.fX-fSize.fX, size.fY-fSize.fY);

// if we went outside of viewRect, then reflect against wall
        if (fPosition.fX < viewRect.fLeft && fVelocity.fX < 0)
            { fVelocity.fX = -fVelocity.fX; }
        if (fPosition.fX > viewRect.fRight && fVelocity.fX > 0)
            { fVelocity.fX = -fVelocity.fX; }
        if (fPosition.fY < viewRect.fTop && fVelocity.fY < 0)
            { fVelocity.fY = -fVelocity.fY; }
        if (fPosition.fY > viewRect.fBottom && fVelocity.fY >0)
            { fVelocity.fY = -fVelocity.fY; }
```

```
            if (!fMouseDrag) {
                    // move the ball
                    fPosition += fVelocity;
                    fOval.fBounds.Set(fPosition-fSize, fPosition+fSize);
                    }
endif
            }
    else
            {
            fSize += 4;
            fOval.fBounds.Set(fPosition-fSize, fPosition+fSize);
            if (fSize.fX == 9) {
                    fWorldPort->PlaySound(TNekoSfx::kShot);
                    }
            }
    }

Boolean TBall::IsAlive()
    {
    return (fSize.fX < 20);  // when size of circles exceeds, then die
    } if 0
void TBall::CollisionCheck()
    {
    // get object list
    TDeque *theObjList = fWorldPort->GetObjList();
    TWorldObj *object;
    for ( object = (TWorldObj*) theObjList->First();
                        object != NULL;
                        object = (TWorldObj*) theObjList->After(object) ) {
            if (object != this) {
                    if (object->Collider()) { // is it a collidable object?
                            if (Bounds().Intersects(object->Bounds())) {  // found collision
                                    // exchange velocities with the other object
                                    fOldVelocity = fVelocity;
                                            // save so that collider gets good info
                                    fVelocity = object->GetOldVelocity();
                                    break; // we only allow a single collision now!
                                    }
                            }
                    }
            }
    }
endif Boolean TBall::Collider() // returns true if object is collidable
    {
    return TRUE;
    }

TGPoint TBall::GetOldVelocity()
    {
    return fOldVelocity;
    }
```

```cpp
void TBall::SetColor(GIntensity r, GIntensity g, GIntensity b)
    {
        red = r; green = g; blue = b;
    } void TBall::Draw(TGrafPort* myGrafPort)
    {
        if (fAlive)
            {
            TFillBundle fillColor(red, green, blue);
            myGrafPort->Fill(fOval, &fillColor);
            }
        else
            {
            if (IsAlive())
                {
                //float b = 1-(fSize.fX/50);  // brightness should decrease as we die
                //TFrameBundle frameColor(red*b, green*b, blue*b);
                TFillBundle frameColor(red, green, blue);
                //frameColor.SetPenWidth(3);
                myGrafPort->Fill(fOval, &frameColor);
                }
            }
    }

TGRect TBall::Bounds()
    {
        TGRect theBounds;
        fOval.GetBounds(theBounds);
        return theBounds;
    } void TBall::Death()
    {
        if (fAlive) // prevent doing this stuff twice
            {
            TWorldMsg *message= new TWorldMsg(TToken("ballDied"));
                                                    // for the score counter
            fWorldPort->PostEvent(message);
            fAlive = FALSE;
            }
    }
```

//
//==============================================================//
//                                                              //
//                              //
//                              TBox
//                      //
//                                              //
//                                              //
//==============================================================//

```cpp
TBox::TBox(TWorldPort* itsWorldPort, TMyView* itsView) :
    TWorldObj(itsWorldPort, itsView)
```

```
{
    fPosition.fX = 150;
    fPosition.fY = 150;
    fdH = 8;
    fHeight = 50;
    fPaused = TRUE;
}

TBox::~TBox()
{
} short TBox::ClassName()
{
    return 3;
} void TBox::Animate()
{
    fOldBounds = Bounds();  // remember where we were before making changes
    TrackMouse();

if (!fPaused) {
        if (fHeight < 10)
            { fPaused = TRUE; }  // this allows only one iteration of the sequence
        if ((fHeight < 10) || (fHeight > 100))
            { fdH = -fdH; }
        fHeight += fdH;
    }
} void TBox::CollisionCheck()
{
    // get object list
    TDeque *theObjList = fWorldPort->GetObjList();
    TWorldObj *object;
    for ( object = (TWorldObj*) theObjList->First();
                    object != NULL;
                    object = (TWorldObj*) theObjList->After(object) ) {
        if (object != this) {
            if (Bounds().Intersects(object->Bounds())) {  // found a collision
                // leave pause state on collision
                fPaused = FALSE;
                break;  // we don't care about other collisions
            }
        }
    }
} void TBox::Draw(TGrafPort* myGrafPort)
{
    if (fAlive) {
        TRect box(Bounds());
        box.Draw(myGrafPort);
    }
```

```
TGRect TBox::Bounds()
    {
    TGRect theBounds(fPosition.fX, fPosition.fY-fHeight, fPosition.fX+30,
fPosition.fY);
    return theBounds;
    }

TGPoint TBox::GetFocus()
    {
    TGPoint focus;
    focus.fX = fPosition.fX + 15;
    focus.fY = fPosition.fY-fHeight;    // return top of the box
    return focus;
    }
```

```
//==============================================================//
//                                                              //
//                              TEyes                           //
//                                                              //
//                                                              //
//==============================================================//

TEyes::TEyes(TWorldPort* itsWorldPort, TMyView* itsView) :
    TWorldObj(itsWorldPort, itsView)
    {
    fEye1 = new TGOval;
    TGPoint         mySize;          // size of content frame
    float           es;              // eye size
    TGOval          fOutline1;       // the oval eye1 outline // a bunch of variables
    mySize = fView->GetSize();
    penWidth = sqrt(mySize.fX*mySize.fY)/13.0;   // outline pen width
    osx = (mySize.fX-4*penWidth)/2.0;            // outline size x
    osy = mySize.fY-2*penWidth;                  // outline size y
    es = 2*penWidth;                             // eye size
    esd2 = (int) es/2;                           // eye size divided by 2
    aa = (osy - penWidth - es)/2.0;              // max eye movement semi-major axis
    bb = (osx - penWidth - es)/2.0;              // max eye movement semi-minor axis
    fPosition.fX = penWidth+osx/2;
    fPosition.fY = penWidth+osy/2;
    fStartPosition = fPosition;                  // remember where we came from // form the big oval as offscreen buffer to speed drawing
    fOutline1.fBounds.fLeft = penWidth;
    fOutline1.fBounds.fRight = osx+penWidth;
    fOutline1.fBounds.fTop = penWidth;
    fOutline1.fBounds.fBottom = osy+penWidth;

// set up the offscreen buffer
    TGRect arect = fOutline1.fBounds;
```

```
        TPoint apoint(arect.fLeft-penWidth/2, arect.fTop-penWidth/2);
        arect.fRight += penWidth/2;
        arect.fBottom += penWidth/2;
        fOvalBuff = new TImage(apoint, arect.fRight, arect.fBottom, k256Colors);
        fOvalPort = new TGrafPort(fOvalBuff->GetGrafDevice());

// clear the buffer to white
        TFrameBundle whiteFill(65535, 65535, 65535);
        fOvalPort->Fill(fOvalBuff->GetBounds(), &whiteFill);

// draw the oval into the buffer
        TFrameBundle foutlineColor(15000, 20000, 40000);          // blue outlines
        foutlineColor.SetPenWidth(penWidth);
        fOvalPort->Frame (fOutline1, &foutlineColor);

// register for "start dragging" events here
        }

TEyes::~TEyes()
        {
        delete fEye1;
        } short TEyes::ClassName()
        {
        return 4;
        } void TEyes::Draw(TGrafPort* myGrafPort)
        {
        // copy the oval from offscreen
        TGRect arect = fOvalBuff->GetBounds();
        myGrafPort->CopyImage(fOvalPort, arect, Bounds());

// draw the eye
        TFillBundle feyeColor(55535, 10000, 20000);               // yellow eyes
        Intersect(fPosition.fX, fPosition.fY);
        myGrafPort->Fill (*fEye1, &feyeColor);
        }

TGRect TEyes::Bounds()
        {
        TGRect arect = fOvalBuff->GetBounds();
        arect.Offset(fPosition-fStartPosition);
        return arect;
        }

TGPoint TEyes::GetFocus()
        {
        TGPoint center;
        TGRect eye = fEye1->fBounds;
        center.fX = (eye.fLeft + eye.fRight)/2;
        center.fY = (eye.fTop + eye.fBottom)/2;
        return center;
        } void TEyes::Intersect(float x0, float y0) {
```

```
// intersection of ellipse x0,y0,a,b & line (x0->mouseLoc.fX,y0->mouseLoc.fY)
//TGPoint tracker = fWorldPort->fMousePosition;  // to track mouse
TGPoint tracker = fConnectObj->GetFocus();  // to track ball float dx = tracker.fX-x0;
float dy = tracker.fY-y0;
float max = sqrt((dx*dx+dy*dy)/(aa*bb));    // max ellipse at dist gm(aa,bb)
if              (max > 1.0) max = 1.0;
else if (max < .01) max = .01;
float a = aa*max ; float b = bb*max;

float x,y;
if (dx == 0) {                                        // special case if line vertical
        x = x0;
        if (dy > 0) y = y0 + a;
        else             y = y0 - a;
        }
else {                                                // intersect elipse and line
        float m = dy/dx;
        float sqrk = sqrt( 1.0 / ( 1.0/(b*b) + (m*m)/(a*a) ) );
        if (tracker.fX > x0) x = x0 + sqrk;    // which of 2 intersections
        else                           x = x0 - sqrk;
        y = y0 + m*(x-x0);
        } fEye1->fBounds.fLeft   = (int) x-esd2;           // new eye position
fEye1->fBounds.fRight  = (int) x+esd2;
fEye1->fBounds.fTop    = (int) y-esd2;
fEye1->fBounds.fBottom = (int) y+esd2;
}

Boolean TEyes::HandleEvent(TWorldMsg *theEvent) {
    if (TWorldObj::HandleEvent(theEvent)) {
            return TRUE;  // it was a mousedown that we ate
            }
    else {
        Boolean answer = FALSE;
        TToken tok;
        theEvent->GetString(tok);
        if (tok == TToken("startDrag")) {
                if (theEvent->fObject != this) { // ignore if dragging self
                        ConnectTo(theEvent->fObject);
                        answer = FALSE;
                             // let the startDrag message be passed to everyone
                        }
                }
        return answer;
        }
}

//
//================================================================//
//
//                                              //
//                                              TPoly
//                              //
```

```
//                                                                    //
//                                                                    //
//====================================================================//

TPoly::TPoly(TWorldPort* itsWorldPort, TMyView* itsView) :
        TWorldObj(itsWorldPort, itsView)
        {
        fWidth = 4;
        fLength = 20;
        fPosition = fWorldPort->fMousePosition;
        fDragPt = fPosition;
        fDragPt.fX -= fLength;              // displace the dragpt to the left
        fPolygon = new TGPolygon(3);
        fLine = new TGLine;
        fDyingRect = new TGRect;
        fSize = 3;
        }

TPoly::~TPoly()
        {
        delete fPolygon;
        delete fLine;
        } void TPoly::Death()
        {
        if (fAlive)
                {
                fAlive = FALSE;
                }
        } short TPoly::ClassName()
        {
        return 5;
        }

Boolean TPoly::HandleEvent(TWorldMsg *theEvent)
        {
        Boolean answer = FALSE;
        TToken tok;
        theEvent->GetString(tok);
        // there must be a more elegant C way of doing the following:
        if (tok == TToken("mouseDown"))
                { answer = HandleMouseDown(theEvent); }
        return answer;
        }

Boolean TPoly::HandleMouseDown(TWorldMsg *theEvent)
        {
        // we always eat all mouse events now that we are a cannon firing bullets
        TGPoint velocity = fPosition-fDragPt;
        //velocity.fX *= 2;
        //velocity.fY *= 2;
        TWorldObj* bullet = new TBullet(fWorldPort, fView, fPosition, velocity, 2);
                                                        // 2= ball
```

```
        bullet->SetColor(.9, .2, .2);
        fWorldPort->AddObject(bullet, FALSE/*last*/);  // add bullet to front of list
        return TRUE; // we eat the event ALWAYS
        } void TPoly::Animate()
        {
        fOldBounds = Bounds();  // remember where we were before making changes
        if (fAlive)
                {
                fPosition = fWorldPort->fMousePosition;

// get the viewRect
                TGRect viewRect;
                TGPoint size = fView->GetSize();
                viewRect.Set(10, 10, size.fX-10, size.fY-10);
                // if we went outside of viewRect, then pin against wall
                if (fPosition.fX < viewRect.fLeft)
                        { fPosition.fX = viewRect.fLeft; }
                if (fPosition.fX > viewRect.fRight)
                        { fPosition.fX = viewRect.fRight; }
                if (fPosition.fY < viewRect.fTop)
                        { fPosition.fY = viewRect.fTop; }
                if (fPosition.fY > viewRect.fBottom)
                        { fPosition.fY = viewRect.fBottom; }

PerfectPoly();  // get new polygon

// we don't get informed we've died until after we've drawn once already!
                fDyingRect->Set(fPosition,fPosition);
                fDyingRect->Inset(-5, -5);
                }
        else
                {
                fSize += 5;
                fDyingRect->fTop = fPosition.fY-fSize;
                fDyingRect->fLeft = fPosition.fX-fSize;
                fDyingRect->fBottom = fPosition.fY+fSize;
                fDyingRect->fRight = fPosition.fX+fSize;
                // we start the sound here to ensure sound starts after explosion
                if (fSize == 8) {
                        fWorldPort->PlaySound(TNekoSfx::kExplode);
                        }
                }
        }

Boolean TPoly::IsAlive()
        {
        return (fSize < 30);  // when size of circles exceeds, then die
        }

Boolean TPoly::Collider()
        {
        return TRUE;
        } void TPoly::PerfectPoly()
```

```
{
//       pt0
//    fMouse
// pt1              pt3
//       fDragPt
//       pt2
//              fOldDragPt
//
// make the perfect polygon to fit the points
// on entry, fPosition has been updated to the new mouse position
// but fDragPt is still at the old drag point.
// we make a polygon that is a bar going from fPosition to fOldDragPt,
// with length fLength, so fDragPt is between fPosition & fOldDragPt.
// Use pythagorean theorem to find fDragPt & poly corners.
float AA, BB;
AA = fDragPt.fY-fPosition.fY;
BB = fDragPt.fX-fPosition.fX;
TGPoint delta = Pythagoras(BB, AA, fLength);
fDragPt = fPosition + delta;

// draw a line only partway along the length, so user knows where mouse is
TGPoint partway;
partway = fPosition + (delta/2);
fLine->Set(fPosition, partway);

// now we want to use the perpendicular slope to get the endpoints
// perpendicular, so inverse negative slope
delta = Pythagoras(-AA, BB, fWidth);
// now we can use this offset for all four poly points
#if 0
fPolygon->SetPoint(0, fPosition.fX+delta.fX, fPosition.fY+delta.fY);
fPolygon->SetPoint(1, fPosition.fX-delta.fX, fPosition.fY-delta.fY);
fPolygon->SetPoint(2, fDragPt.fX-delta.fX, fDragPt.fY-delta.fY);
fPolygon->SetPoint(3, fDragPt.fX+delta.fX, fDragPt.fY+delta.fY);
#else
fPolygon->SetPoint(0, fPosition.fX, fPosition.fY);
fPolygon->SetPoint(1, fDragPt.fX-delta.fX, fDragPt.fY-delta.fY);
fPolygon->SetPoint(2, fDragPt.fX+delta.fX, fDragPt.fY+delta.fY);
#endif
} void TPoly::Draw(TGrafPort* myGrafPort)
{
if (fAlive) {
        TFillBundle aColor(55535, 10000, 20000);           // yellow
        myGrafPort->Fill (*fPolygon, &aColor);
        #if 0
        TFrameBundle bColor(20000, 10000, 55535);          // blue
        myGrafPort->Frame (*fLine, &bColor);
        #endif
        }
else {
        if (IsAlive())
                {
                TFillBundle cColor(55535, 10000, 20000);
                myGrafPort->Fill(*fDyingRect, &cColor);
```

```
        }
    }
}

TGRect TPoly::Bounds()
    {
    TGRect arect;
    if (fAlive)
        {fPolygon->GetBounds(arect);}
    else
        {arect = *fDyingRect;}
    return arect;
    }
//================================================================//
//                                                                //
//                              TBullet                           //
//                                                                //
//                                                                //
//================================================================//

TBullet::TBullet(TWorldPort* itsWorldPort, TMyView* itsView,
                const TGPoint& start, const TGPoint& velocity, short prey) :
        TWorldObj(itsWorldPort, itsView), fColor(0xffff, 0x0000, 0x0000)
    {
    fPrey = prey;
    fPosition= start;
    fVelocity = velocity;
    fLine = new TGLine;
    fLine->Set(fPosition, fPosition);  // so that OldBounds is reasonable...
    fArmed = FALSE;
    fCounter = 0;
    fIsDead = FALSE;
    }

TBullet::~TBullet()
    {
    delete fLine;
    } short TBullet::ClassName()
    {
    return 6;
    }

Boolean TBullet::HandleEvent(TWorldMsg *theEvent)
    {
    return FALSE;  // should never eat an event
    } void TBullet::Animate()
    {
    fOldBounds = Bounds();  // remember where we were before making changes
```

```
    // get the viewRect
    TGRect viewRect;
    TGPoint size = fView->GetSize();
    viewRect.Set(0, 0, size.fX, size.fY);

// move the bullet
    fPosition += fVelocity;

// form the bullet
    TGPoint tail = fPosition - fVelocity;
    fLine->Set(fPosition, tail);

if (!fArmed)
        {
        if (fCounter >= 1) {
            fArmed = TRUE;
                // arm ourselves after the first time, to avoid killing our creator
            }
        fCounter += 1;
        } if (!fAlive)
        { fIsDead = TRUE; } // gives us an extra frame after dying

// if we went outside of viewRect, then we should die
    Boolean expire = !viewRect.Contains(fPosition);
    if (expire)
        { Death(); } // tell worldport to kill myself

}

Boolean TBullet::IsAlive()
    {
    return !fIsDead;
    } void TBullet::CollisionCheck()
    {
    if (fArmed)
        {
        // get object list
        TDeque *theObjList = fWorldPort->GetObjList();
        TWorldObj *object;
        for ( object = (TWorldObj*) theObjList->First();
                        object != NULL;
                        object = (TWorldObj*) theObjList->After(object) ) {
            if (object != this) {
                //if (object->Collider()) {
                short itsClass = object->ClassName();
                if ((itsClass == fPrey) || (itsClass == 6)) {
                    // collide with prey or bullets
                    // for collision detection, we don't want to use
                    // the bounds of bullet,
                    // because it's too wide
                    if (fLine->Intersects(object->Bounds())) {
                        // found a collision
```

```
                    // kill off the object, and ourselves
                    object->Death();
                    Death();
                    break; // we only allow a single collision now!
                }
            }
        }
    }
}

Boolean TBullet::Collider()  // returns true if object is collidable
{
    return TRUE;
} void TBullet::SetColor(GIntensity r, GIntensity g, GIntensity b)
{
    TFrameBundle aColor(r, g, b);
    fColor = aColor;
} void TBullet::Draw(TGrafPort* myGrafPort)
{
    if (IsAlive())
        {myGrafPort->Frame (*fLine, &fColor);}
}

TGRect TBullet::Bounds()
{
    TGRect theBounds;
    fLine->GetBounds(theBounds);
    theBounds.Inset(0,-1); // make larger in Y, because horizontal lines are getting
            // left behind
    return theBounds;
}
```

```
//
//===========================================================================//
//
//                                        //
//                                        TScore
//                                        //
//
//                                        //
//===========================================================================//

TScore::TScore(TWorldPort* itsWorldPort, TMyView* itsView) :
    TWorldObj(itsWorldPort, itsView)
    {
    fPosition.fX = 15;
    fPosition.fY = 15;
    fdH = 4;
    fScore = 0;
```

```
        }

TScore::~TScore()
        {
        } short TScore::ClassName()
    {
        return 7;
    } void TScore::Draw(TGrafPort* myGrafPort)
    {
        if (fAlive) {
            TGRect box(Bounds());
            TFillBundle cColor(0,0,0xffff);
            myGrafPort->Fill(box, &cColor);
            }
    }

TGRect TScore::Bounds()
    {
        TGRect theBounds(fPosition.fX, fPosition.fY, fPosition.fX+(fScore*fdH),
                                                    fPosition.fY+10);
        return theBounds;
    }

Boolean TScore::HandleEvent(TWorldMsg *theEvent)
    {
        Boolean answer = FALSE;
        TToken tok;
        theEvent->GetString(tok);
        if (tok == TToken("ballDied"))
            {
            fScore += 1;
            answer = TRUE; // we ate the event
            }
        return answer;
    }
```

What is claimed is:

1. A computer implemented process for generating and manipulating animated objects in a computer system, said computer system including a processor, a memory means coupled to said processor, a display means coupled to said processor, and a master clock coupled to said processor for maintaining a global time, said process comprising the computer implemented steps of:

generating a plurality of animated objects represented by an object database residing in said memory means, each of said animated objects comprising state data representing a state of said object and each of said animated objects comprising methods representing a behavior of said object, said state data and said methods located within said object database;

animating said animated objects by executing said methods thereby causing said animated objects to transition from a first state to a second state, said first state and said second state represented by said state data;

manipulating a descriptive representation of said object, said descriptive representation comprising a plurality of image frames representing said object at different instants of time, said descriptive representation manipulated when said method associated with said animated objects is activated by said computer system that manipulates said descriptive representation; and manipulating a mathematical representation of said objects, said mathematical representation comprising a plurality of functions for operating upon a plurality of parameters associated with said objects, said mathematical representation manipulated when said method associated with said animated objects is activated by said computer system that manipulates said mathematical representation.

2. The computer implemented process for generating and manipulating animated objects in a computer system of claim 1, wherein each said animated object includes an affect agent associated with said animated object and an affect volume associated with said affect agent, said process including the computer implemented steps of:

detecting interactions between said animated objects, said interactions occurring when said affect volume associated with said affect agent of said animated object intersects with an affect volume associated with an affect agent of another said animated object, said step of detecting interactions performed by an interaction manager coupled to said memory means;

communicating between affect agents as a result of said interactions detected in said detecting step in order to determine a result of said interactions, said step of communicating initiated by said interaction manager;

modifying said animated objects using said affect agents and said result of said interactions, said step of modifying said animated objects performed by said affect agents.

3. The computer implemented process for generating and manipulating animated objects in a computer system of claim 2, further comprising the computer implemented step of rendering said animated objects on said display means for each said object and wherein said methods of said behavior include a method for visual display.

4. The computer implemented process for generating and manipulating animated objects in a computer system of claim 3, wherein said computer implemented step of rendering comprises:

combining displayable representations of said objects into an animation frame within said memory means;

displaying said animation frame on said display means.

5. The computer implemented process for generating and manipulating animated objects in a computer system of claim 2, wherein one said state of said object has an associated two-dimensional coordinate combined with a limited Z axis coordinate representing the position of said object in a world model.

6. The computer implemented process for generating and manipulating animated objects in a computer system of claim 2, wherein one said state of said object has an associated three-dimensional coordinate representing the position of said object in a world model.

7. The computer implemented process for generating and manipulating animated objects in a computer system of claim 2, wherein one said state of said object has an associated two-dimensional coordinate combined with a limited Z axis coordinate representing the position of said object in a world model and an associated three-dimensional coordinate also representing the position of said object in said world model.

8. The computer implemented process for generating and manipulating animated objects in a computer system of claim 2, wherein one said state of said object is a local time frame referenced from said global time.

9. The computer implemented process for generating and manipulating animated objects in a computer system of claim 2, wherein said state of said object is computed in said animating step relative to an instant of said global time.

10. The computer implemented process for generating and manipulating animated objects in a computer system of claim 9, wherein said plurality of functions associated with said mathematical representation is a plurality of parametric equations.

11. The computer implemented process for generating and manipulating animated objects in a computer system of claim 2, wherein said state of said object is computed in said animating step relative to an interval of said global time.

12. The computer implemented process for generating and manipulating animated objects in a computer system of claim 2, wherein said state of said object can be computed in said animating step relative to an instant of said global time and relative to an interval of said global time.

13. The computer implemented process for generating and manipulating animated objects in a computer system of claim 2, wherein said affect volume changes shape relative to the motion of said animated object.

14. The computer implemented process for generating and manipulating animated objects in a computer system of claim 2, wherein said computer implemented step of communicating further comprises the computer implemented steps of:

initiating computer implemented process tasks to execute affect agents, said affect agents associated with objects involved in said interaction;

controlling communication between said objects, said step of controlling including sequencing the computer implemented process tasks to activate said affect agents.

15. The computer implemented process for generating and manipulating animated objects in a computer system of claim 2, wherein said methods are executed in said animating step according to a plurality of rules specifying said behavior of said animated object.

16. The computer implemented process for generating and manipulating animated objects in a computer system of claim 2, wherein said methods are executed in said animating step according to a state graph specifying said behavior of said animated object, said state graph specifying authorized transitions from one said state to another.

17. The computer implemented process for generating and manipulating animated objects in a computer system of claim 2, wherein said methods are executed in said animating step according to a script specifying said behavior of said animated object, said script comprising a plurality of commands for modifying or querying said behavior of said animated object.

18. The computer implemented process for generating and manipulating animated objects in a computer system of claim 17, wherein said script for specifying said behavior of said animated object includes commands for looping wherein a plurality of said commands in a loop are repeatedly executed until a terminating condition is satisfied.

19. The computer implemented process for generating and manipulating animated objects in a computer system of claim 17, wherein said script for specifying said behavior of said animated object includes commands for user interaction wherein information messages may be sent to a user and received from a user of said computer system.

20. The computer implemented process for generating and manipulating animated objects in a computer system of claim 2, further comprising the computer implemented steps of:

cutting said animated object and removing said animated object and said state data and said methods from a current position in said memory means and storing said animated object in a temporary buffer in said memory means; and pasting said animated object and removing said animated object and said state data and said methods from a temporary buffer in said memory means and storing said animated object in a new position in said memory means.

21. A computer implemented process for generating and manipulating animated objects in a computer system, said computer system including a processor, a memory means coupled to said processor, a display means coupled to said processor, and a master clock coupled to said processor for maintaining a global time reference, said process comprising the computer implemented steps of:

generating a plurality of animated object each represented by state data representing a state of each animated object, said state data comprising object position, object size, or object orientation, and further represented by and method data representing methods of behavior of said each animated object which indicate actions that said each animated object may perform, said state data and said method data stored in and retrieved from an object database residing in said memory means and having a configuration based on said plurality of animated objects;

animating said animated objects by executing methods represented by said method data associated with said each of said animated objects thereby causing said animated objects to transition from a first state to a second state, said first state and said second state represented by said state data of said object database;

manipulating pixmap representations of each of said animated objects, said pixmap representations comprising a plurality of image frames representing said each animated object at different instants of time, said pixmap representations manipulated when said methods represented by method data associated with said each animated object are executed by said computer system; and manipulating a mathematical representation of said objects, said mathematical representation comprising a plurality of functions for operating upon a plurality of data points of said each animated object, said mathematical representation manipulated when said methods represented by method data associated with said each animated object are executed by said computer system.

22. The computer implemented process for generating and manipulating animated objects in a computer system of claim 21, wherein:

said each animated object includes an associated plurality of affect volumes, each of said affect volumes further associated with a particular type of object interaction, said plurality of affect volumes residing in said object database; and wherein said each animated object includes an associated affect agent for each said affect volume, said associated affect agent defining an appropriate reaction to be taken by said each animated object upon said object interaction with one or more other of said animated objects, said affect agent residing in said object database.

23. The computer implemented process for generating and manipulating animated objects in a computer system of claim 22, further comprising the computer implemented steps of:

detecting interaction between said animated objects by monitoring said plurality of affect volumes of each of said animated objects, said interaction occurring when an affect volume associated with an affect agent of an animated object intersects with a corresponding affect volume associated with an affect agent of another animated object, said step of detecting interaction executed by an interaction manager, said interaction manager communicatively coupled to said object database;

communicating between affect agents associated with said interaction as a result of said interaction detected in said detecting step in order to determine a result of said interaction, said step of communicating initiated and executed by said interaction manager;

modifying said state data of said animated objects according to said affect agents associated with said interaction.

24. The computer implemented process for generating and manipulating animated objects in a computer system of claim 23, further comprising the computer implemented steps of:

manipulating said pixmap representations of said each animated object during periods when said each animated object is not being interacted with by other animated objects in said computer system; and manipulating said mathematical representation of said each animated object during period when said each animated object is being interacted with by other animated objects in said computer system.

25. The computer implemented process for generating and manipulating animated objects in a computer system of claim 23, further comprising the computer implemented step of rendering said animated objects on said display means for each said object and wherein said methods of said behavior include a method for visual display.

26. The computer implemented process for generating and manipulating animated objects in a computer system of claim 25, wherein said computer implemented step of rendering comprises the computer implemented steps of:

combining displayable representations of said objects into an animation frame within said memory means; and displaying said animation frame on said display means.

27. The computer implemented process for generating and manipulating animated objects in a computer system of claim 23, wherein said state data of one of said animated objects has an associated two-dimensional coordinate combined with a limited Z axis coordinate representing a position of said one animated object in a world model.

28. The computer implemented process for generating and manipulating animated objects in a computer system of claim 23, wherein said state data of one of said animated objects has an associated three-dimensional coordinate representing the position of said one animated object in a world model.

29. The computer implemented process for generating and manipulating animated objects in a computer system of claim 23, wherein said state data of one of said animated objects has an associated two-dimensional coordinate combined with a limited Z axis coordinate representing a position of said one animated object in a world model and said state data of said one animated objects also has an associated three-dimensional coordinate representing the position of said one animated object in a world model.

30. The computer implemented process for generating and manipulating animated objects in a computer system of claim 23, wherein said computer implemented step of communicating further comprises the computer implemented steps of:

initiating computer implemented process tasks to execute affect agents, said affect agents associated with objects involved in said interaction; and controlling communication between said objects, said step of controlling including sequencing the computer implemented process tasks to activate said affect agents.

31. The computer implemented process for generating and manipulating animated objects in a computer system of claim 23, wherein said methods of said behavior are executed by said computer system in said animating step according to a plurality of rules specifying said behavior of said animated object.

32. The computer implemented process for generating and manipulating animated objects in a computer system of claim 23, wherein said methods are executed in said animating step according to a state graph specifying said behavior of said animated object, said state graph specifying authorized transitions from one said state to another.

33. The computer implemented process for generating and manipulating animated objects in a computer system of claim 23, wherein said methods are executed in said animating step according to a script specifying said behavior of said animated object, said script comprising a plurality of commands for modifying or querying said behavior of said animated object.

34. The computer implemented process for generating and manipulating animated objects in a computer system of claim 33, wherein said script for specifying said behavior of said animated object includes commands for looping wherein a plurality of said commands in a loop are repeatedly executed until a terminating condition is satisfied.

* * * * *